(12) United States Patent
Fanara

(10) Patent No.: US 11,505,054 B2
(45) Date of Patent: Nov. 22, 2022

(54) HYBRID ELECTRIC/COMBUSTION PROPULSION AND ELECTRIC GENERATOR APPARATUS

(71) Applicant: CUSTOMACHINERY INC., Mississauga (CA)

(72) Inventor: Roberto Fanara, Mississauga (CA)

(73) Assignee: CUSTOMACHINERY INC., Mississauga (CA)

( * ) Notice: Subject to any disclaimer, the term of this patent is extended or adjusted under 35 U.S.C. 154(b) by 12 days.

(21) Appl. No.: 17/390,201

(22) Filed: Jul. 30, 2021

(65) Prior Publication Data

US 2022/0041044 A1 Feb. 10, 2022

Related U.S. Application Data

(60) Provisional application No. 63/062,331, filed on Aug. 6, 2020.

(51) Int. Cl.
*B60K 6/26* (2007.10)
*B60K 6/383* (2007.10)
*B60K 6/24* (2007.10)

(52) U.S. Cl.
CPC ............ *B60K 6/26* (2013.01); *B60K 6/24* (2013.01); *B60K 6/383* (2013.01); *B60K 2006/268* (2013.01)

(58) Field of Classification Search
CPC . B60K 6/26; B60K 6/24; B60K 6/383; B60K 6/38; B60K 6/48; B60K 6/387; B60K 6/00; B60K 6/22; B60K 6/20; B60K 2006/268; B60K 2006/541; F16D 43/18; F16D 43/00; F16D 43/14; F16D 43/04; F16D 43/02
See application file for complete search history.

(56) References Cited

U.S. PATENT DOCUMENTS 5,193,634 A * 3/1993 Masut ................. B60L 15/2054
903/909
5,773,904 A 5/1998 Schiebold et al.
(Continued)

FOREIGN PATENT DOCUMENTS

WO WO 2004/054836 A1 7/2004

*Primary Examiner* — James M Dolak
(74) *Attorney, Agent, or Firm* — Alston & Bird LLP

(57) ABSTRACT

A hybrid electric/combustion propulsion/electric generator apparatus comprising: a driven shaft mating mechanism; a hub mating mechanism; an electric machine operable as an electric motor or generator, comprising a rotor comprising a drum; a clutch mechanism, comprising first and second mating mechanisms, axially slidable and engaged with the drum/rotor; and a selection mechanism for sliding the clutch mechanism into a start position (wherein the electric motor can rotate the centrifugal clutch to rotate the driving shaft), a neutral position (wherein rotation of the drum/rotor operates the electric machine as the generator), or a drive position, wherein the apparatus is operable in either a pure electric drive mode (electric motor drives the driven shaft clockwise or counter clockwise while the centrifugal clutch is disengaged), or a hybrid drive mode (engine and electric motor drive the driven shaft) or a propulsion/generation mode (engine drives the driven shaft and generator produces electricity).

20 Claims, 15 Drawing Sheets

(56) References Cited

U.S. PATENT DOCUMENTS

| | | | |
|---|---|---|---|
| 5,931,271 A | 8/1999 | Haka | |
| 6,007,443 A * | 12/1999 | Onimaru | B60L 50/61 |
| | | | 475/5 |
| 6,208,036 B1 | 5/2001 | Evans et al. | |
| 6,645,017 B1 | 11/2003 | Skrzypek et al. | |
| 6,659,910 B2 * | 12/2003 | Gu | B60K 6/442 |
| | | | 474/18 |
| 6,720,696 B2 * | 4/2004 | Berhan | B60K 6/26 |
| | | | 310/67 R |
| 6,781,272 B2 | 8/2004 | Kahlon et al. | |
| 6,888,273 B2 * | 5/2005 | Hughes | F16D 48/06 |
| | | | 310/78 |
| 7,351,265 B2 * | 4/2008 | Vitale | B60L 50/61 |
| | | | 903/903 |
| 7,410,444 B2 * | 8/2008 | Groddeck | F16D 43/18 |
| | | | 192/84.8 |
| 7,469,778 B2 | 12/2008 | Groddeck et al. | |
| 7,998,023 B2 * | 8/2011 | Holmes | B60K 6/387 |
| | | | 477/6 |
| 8,074,758 B2 * | 12/2011 | Angeletti | B60K 17/24 |
| | | | 180/165 |
| 8,360,181 B2 * | 1/2013 | Wei | B60K 6/36 |
| | | | 180/338 |
| 8,499,867 B2 * | 8/2013 | Marcacci | B60K 6/38 |
| | | | 180/65.285 |
| 8,920,275 B2 | 12/2014 | Reitz et al. | |
| 10,328,786 B2 * | 6/2019 | Singh | F16H 3/66 |
| 10,882,512 B2 * | 1/2021 | Kobler | B60W 10/08 |
| 10,926,620 B2 | 2/2021 | McBride et al. | |
| 2003/0080637 A1 | 5/2003 | Berhan | |
| 2004/0084979 A1 | 5/2004 | Hughes et al. | |

\* cited by examiner

HYBRID ELECTRIC/COMBUSTION PROPULSION AND ELECTRIC GENERATOR APPARATUS

CROSS-REFERENCE TO RELATED APPLICATIONS

This application claims the benefit of and priority to U.S. Provisional Patent Application Ser. No. 63/062,331, filed Aug. 6, 2020; the contents of which as are hereby incorporated by reference in their entirety.

BACKGROUND

Related Field

The following relates generally to a hybrid electric/combustion propulsion and electric generator apparatus, and more particularly to a hybrid electric/combustion propulsion and electric generator apparatus with a single non-friction-based clutch mechanism and a single operating mode selection mechanism for positioning the single non-friction-based clutch mechanism into one of (i) a start position, (ii) a neutral position, and (iii) a drive position.

Related Art

Hybrid engines combine traditional internal combustion engine and electric motor technologies to provide a hybrid propulsion mechanism that combines the power provided by the air-fuel combustion of an internal combustion engine and the power provided by an electric motor. A centrifugal clutch comprises a central hub, a circular housing or drum about the hub, and spring-loaded flyweights or shoes between the hub and the drum. Rotation of a centrifugal clutch to a threshold speed causes the flyweights to move outward (i.e., away from the hub), by centrifugal force, until the flyweights frictionally engage the drum to thereby cause rotation of the drum and a driven shaft that is in cooperative engagement with the drum. In this way, centrifugal clutches may be used to transmit power from an engine crankshaft to a driven shaft solely by driving an internal combustion engine.

BRIEF SUMMARY

In an aspect of the presently disclosed subject-matter there is provided a hybrid electric/combustion propulsion and electric generator apparatus comprising: (I) an internal combustion engine, (II) a driving shaft, (III) a driven shaft comprising a driven shaft mating mechanism, (IV) a centrifugal clutch between the driving shaft and the driven shaft, the centrifugal clutch comprising: a central hub comprising a hub mating mechanism; a drum about the hub; and spring-loaded flyweights between the hub and the drum; the driving shaft matingly engaged with the hub such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum; (V) an electric machine operable as either an electric motor or an electric generator, the electric machine comprising: a rotor; a stator; and windings on one of the rotor and the stator, the windings comprising an electrically conductive material; the rotor comprising the drum such that rotation of the drum similarly rotates the rotor, and rotation of the rotor similarly rotates the drum; (VI) a single non-friction-based clutch mechanism comprising a first mating mechanism and a second mating mechanism, the clutch mechanism axially slidable and cooperatively engaged with the drum of the centrifugal clutch and the rotor of the electric machine by the first mating mechanism; and (VII) a single operating mode selection mechanism for the axial sliding of the clutch mechanism into one of (i) a start position, (ii) a neutral position, and (iii) a drive position. In the start position, (i) the clutch mechanism is disengaged from the driven shaft, and (ii) the second mating mechanism of the clutch mechanism is matingly engaged with the hub mating mechanism of the hub of the centrifugal clutch and thereby cooperatively engaged with the driving shaft of the internal combustion engine. In the neutral position, the clutch mechanism is disengaged from (i) the driven shaft and (ii) the hub of the centrifugal clutch and thereby disengaged from the driving shaft of the internal combustion engine. In the drive position, (i) the clutch mechanism is disengaged from the hub of the centrifugal clutch and thereby disengaged from the driving shaft of the internal combustion engine, and (ii) the second mating mechanism of the clutch mechanism is matingly engaged with the driven shaft mating mechanism and thereby matingly engaged with the driven shaft of the internal combustion engine. In the start position, the electric machine is operable as the electric motor to rotate the hub of the centrifugal clutch to thereby rotate the driving shaft to start the engine. In the neutral position, driving the driving shaft to rotate the centrifugal clutch to at least the threshold speed causes the rotor to rotate through the frictional engagement between the drum and the flyweights, to thereby operate the electric machine as the generator to produce electricity. In the drive position, either: (i) the apparatus is operable in a pure electric drive mode, wherein the electric machine is operable as the electric motor to drive the driven shaft clockwise or counter clockwise to thereby propel a vehicle comprising the apparatus forward or reverse by electric propulsion only; or (ii) driving the driving shaft to rotate the centrifugal clutch to at least the threshold speed causes rotation of (a) the rotor through the frictional engagement between the drum and the flyweights, and (b) the driven shaft through the mating engagement between the second mating mechanism of the clutch mechanism and the driven shaft mating mechanism of the driven shaft, the apparatus operable either in a hybrid propulsion mode during which both the engine and the electric machine operating as the electric motor drive the driven shaft, or in a propulsion/generation mode, during which only the engine drives the driven shaft and the electric machine operates as the electric generator to produce the electricity.

In another aspect of the presently disclosed subject-matter there is provided a hybrid electric/combustion propulsion and electric generator apparatus for use with an internal combustion engine comprising a driving shaft, a driven shaft, and a centrifugal clutch between the driving shaft and the driven shaft, the centrifugal clutch comprising a central hub, a drum about the hub, and spring-loaded flyweights between the hub and the drum, the driving shaft matingly engaged with the hub such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum, the apparatus comprising: (I) a driven shaft mating mechanism, the driven shaft comprising the driven shaft mating mechanism; (II) a hub mating mechanism, the central hub comprising the hub mating mechanism; (III) an electric machine operable as either an electric motor or an electric generator, the electric machine comprising: a rotor; a stator; and windings on one of the rotor and the stator, the windings comprising an electrically conductive material; the rotor comprising the drum such that rotation of the drum similarly rotates the rotor, and rotation of the rotor similarly rotates the drum; (IV) a single non-friction-based clutch mechanism comprising a first mating mechanism and a second mating mechanism, the clutch mechanism axially slidable and cooperatively engaged with the drum of the centrifugal clutch and the rotor of the electric machine by the first mating mechanism; and (V) a single operating mode selection mechanism for the axial sliding of the clutch mechanism into one of (i) a start position, (ii) a neutral position, and (iii) a drive position. In the start position, (i) the clutch mechanism is disengaged from the driven shaft, and (ii) the second mating mechanism of the clutch mechanism is matingly engaged with the hub mating mechanism of the hub of the centrifugal clutch and thereby cooperatively engaged with the driving shaft of the internal combustion engine. In the neutral position, the clutch mechanism is disengaged from (i) the driven shaft and (ii) the hub of the centrifugal clutch and thereby disengaged from the driving shaft of the internal combustion engine. In the drive position, (i) the clutch mechanism is disengaged from the hub of the centrifugal clutch and thereby disengaged from the driving shaft of the internal combustion engine, and (ii) the second mating mechanism of the clutch mechanism is matingly engaged with the driven shaft mating mechanism and thereby matingly engaged with the driven shaft of the internal combustion engine. In the start position, the electric machine is operable as the electric motor to rotate the hub of the centrifugal clutch to thereby rotate the driving shaft to start the engine. In the neutral position, driving the driving shaft to rotate the centrifugal clutch to at least the threshold speed causes the rotor to rotate through the frictional engagement between the drum and the flyweights, to thereby operate the electric machine as the generator to produce electricity. In the drive position, either: (i) the apparatus is operable in a pure electric drive mode, wherein the electric machine is operable as the electric motor to drive the driven shaft clockwise or counter clockwise to thereby propel a vehicle comprising the apparatus forward or reverse by electric propulsion only; or (ii) driving the driving shaft to rotate the centrifugal clutch to at least the threshold speed causes rotation of (a) the rotor through the frictional engagement between the drum and the flyweights, and (b) the driven shaft through the mating engagement between the second mating mechanism of the clutch mechanism and the driven shaft mating mechanism of the driven shaft, the apparatus operable either in a hybrid propulsion mode during which both the engine and the electric machine operating as the electric motor drive the driven shaft, or in a propulsion/generation mode during which only the engine drives the driven shaft and the electric machine operates as the electric generator to produce the electricity.

In yet another aspect of the presently disclosed subject-matter there is provided a kit for upgrading an internal combustion engine comprising a driving shaft, a driven shaft, and a centrifugal clutch between the driving shaft and the driven shaft, to a hybrid electric/combustion propulsion and electric generator apparatus, the centrifugal clutch comprising a central hub, a drum about the hub, and spring-loaded flyweights between the hub and the drum, the driving shaft matingly engaged with the hub such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum, the kit comprising: (I) a driven shaft mating mechanism matingly attachable to the driven shaft; (II) a hub mating mechanism matingly attachable to the central hub; (III) a rotor matingly attachable to the drum of the centrifugal clutch; (IV) a stator attachable to the engine; (V) windings, comprising an electrically conductive material, on one of the rotor and the stator; (VI) a plurality of magnets evenly spaced about another of the rotor and the stator; (VII) a single non-friction-based clutch mechanism comprising a first mating mechanism and a second mating mechanism, the clutch mechanism for cooperative and axially slidable engagement with the drum of the centrifugal clutch and the rotor by the first mating mechanism; and (VIII) a single operating mode selection mechanism for the axial sliding of the clutch mechanism into one of (i) a start position, (ii) a neutral position, and (iii) a drive position when the kit is assembled to provide the apparatus such that the driven shaft mating mechanism is matingly attached to the driven shaft, the hub mating mechanism is matingly attached to the central hub, the rotor is matingly attached to the drum, the stator is attached to the engine concentrically about the rotor and the drum, and the single operating mode selection mechanism is cooperatively attached to the clutch mechanism. The rotor, the stator, the windings, and the magnets comprise an electric machine operable as either an electric motor or an electric generator, and the electric machine is attachable to a power store. In the start position, (i) the clutch mechanism is disengaged from the driven shaft, and (ii) the second mating mechanism of the clutch mechanism is matingly engaged with the hub mating mechanism of the hub of the centrifugal clutch and thereby cooperatively engaged with the driving shaft of the internal combustion engine. In the neutral position, the clutch mechanism is disengaged from (i) the driven shaft and (ii) the hub of the centrifugal clutch and thereby disengaged from the driving shaft of the internal combustion engine. In the drive position, (i) the clutch mechanism is disengaged from the hub of the centrifugal clutch and thereby disengaged from the driving shaft of the internal combustion engine, and (ii) the second mating mechanism of the clutch mechanism is matingly engaged with the driven shaft mating mechanism and thereby matingly engaged with the driven shaft of the internal combustion engine. In the start position, the electric machine is operable as the electric motor to rotate the hub of the centrifugal clutch to thereby rotate the driving shaft to start the engine. In the neutral position, driving the driving shaft to rotate the centrifugal clutch to at least the threshold speed causes the rotor to rotate through the frictional engagement between the drum and the flyweights, to thereby operate the electric machine as the generator to produce electricity. In the drive position, either: (i) the apparatus is operable in a pure electric drive mode, wherein the electric machine is operable as the electric motor to drive the driven shaft clockwise or counter clockwise to thereby propel a vehicle comprising the apparatus forward or reverse by electric propulsion only; or (ii) driving the driving shaft to rotate the centrifugal clutch to at least the threshold speed causes rotation of (a) the rotor through the frictional engagement between the drum and the flyweights, and (b) the driven shaft through the mating engagement between the second mating mechanism of the clutch mechanism and the driven shaft mating mechanism of the driven shaft, the apparatus operable either in a hybrid propulsion mode during which both the engine and the electric machine operating as the electric motor drive the driven shaft, or in a propulsion/generation mode during which only the engine drives the driven shaft and the electric machine operates as the electric generator to produce the electricity.

In a further aspect of the presently disclosed subject-matter there is provided a kit for upgrading an internal combustion engine comprising a driving shaft, a driven shaft, and a centrifugal clutch between the driving shaft and the driven shaft, to a hybrid electric/combustion propulsion and electric generator apparatus, the centrifugal clutch comprising a central hub, a drum about the hub, and spring-loaded flyweights between the hub and the drum, the driving shaft matingly engaged with the hub such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum, the kit comprising: (I) a driven shaft mating mechanism matingly attachable to the driven shaft; (II) a hub mating mechanism matingly attachable to the central hub; (III) a replacement drum comprising a rotor, for replacing the drum; (IV) a stator attachable to the engine; (V) windings, comprising an electrically conductive material, on one of the rotor and the stator; (VI) a plurality of magnets evenly spaced about another of the rotor and the stator; (VII) a single non-friction-based clutch mechanism comprising a first mating mechanism and a second mating mechanism, the clutch mechanism for cooperative and axially slidable engagement with the replacement drum of the centrifugal clutch and the rotor by the first mating mechanism; and (VIII) a single operating mode selection mechanism for the axial sliding of the clutch mechanism into one of (i) a start position, (ii) a neutral position, and (iii) a drive position when the kit is assembled to provide the apparatus such that the driven shaft mating mechanism is matingly attached to the driven shaft, the hub mating mechanism is matingly attached to the central hub, the replacement drum is installed in place of the drum, the stator is attached to the engine concentrically about the rotor and the replacement drum, and the single operating mode selection mechanism is cooperatively attached to the clutch mechanism. The rotor, the stator, the windings, and the magnets comprise an electric machine operable as either an electric motor or an electric generator, and the electric machine is attachable to a power store. In the start position, (i) the clutch mechanism is disengaged from the driven shaft, and (ii) the second mating mechanism of the clutch mechanism is matingly engaged with the hub mating mechanism of the hub of the centrifugal clutch and thereby cooperatively engaged with the driving shaft of the internal combustion engine. In the neutral position, the clutch mechanism is disengaged from (i) the driven shaft and (ii) the hub of the centrifugal clutch and thereby disengaged from the driving shaft of the internal combustion engine. In the drive position, (i) the clutch mechanism is disengaged from the hub of the centrifugal clutch and thereby disengaged from the driving shaft of the internal combustion engine, and (ii) the second mating mechanism of the clutch mechanism is matingly engaged with the driven shaft mating mechanism and thereby matingly engaged with the driven shaft of the internal combustion engine. In the start position, the electric machine is operable as the electric motor to rotate the hub of the centrifugal clutch to thereby rotate the driving shaft to start the engine. In the neutral position, driving the driving shaft to rotate the centrifugal clutch to at least the threshold speed causes the rotor to rotate through the frictional engagement between the replacement drum and the flyweights, to thereby operate the electric machine as the generator to produce electricity. In the drive position, either: (i) the apparatus is operable in a pure electric drive mode, wherein the electric machine is operable as the electric motor to drive the driven shaft clockwise or counter clockwise to thereby propel a vehicle comprising the apparatus forward or reverse by electric propulsion only; or (ii) driving the driving shaft to rotate the centrifugal clutch to at least the threshold speed causes rotation of (a) the rotor through the frictional engagement between the replacement drum and the flyweights, and (b) the driven shaft through the mating engagement between the second mating mechanism of the clutch mechanism and the driven shaft mating mechanism of the driven shaft, the apparatus operable either in a hybrid propulsion mode during which both the engine and the electric machine operating as the electric motor drive the driven shaft, or in a propulsion/generation mode during which only the engine drives the driven shaft and the electric machine operates as the electric generator to produce the electricity.

In yet a further aspect of the presently disclosed subject-matter there is provided a kit for upgrading an internal combustion engine comprising a driving shaft, a driven shaft, and a centrifugal clutch between the driving shaft and the driven shaft, to a hybrid electric/combustion propulsion and electric generator apparatus, the kit comprising: (I) a replacement centrifugal clutch comprising a central hub, a drum about the hub, and spring-loaded flyweights between the hub and the drum, the hub matingly attachable to the driving shaft such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum, the hub comprising a hub mating mechanism and the drum comprising a rotor; (II) a replacement driven shaft comprising a driven shaft mating mechanism; (III) a stator attachable to the engine; (IV) windings, comprising an electrically conductive material, on one of the rotor and the stator; (V) a plurality of magnets evenly spaced about another of the rotor and the stator; (VI) a single non-friction-based clutch mechanism comprising a first mating mechanism and a second mating mechanism, the clutch mechanism for cooperative and axially slidable engagement with the drum of the replacement centrifugal clutch and the rotor by the first mating mechanism; and (VII) a single operating mode selection mechanism for the axial sliding of the clutch mechanism into one of (i) a start position, (ii) a neutral position, and (iii) a drive position when the kit is assembled to provide the apparatus such that the replacement centrifugal clutch is installed in place of an original centrifugal clutch, the replacement driven shaft is installed in place of an original driven shaft, the stator is attached to the engine concentrically about the rotor and the drum, and the single operating mode selection mechanism is cooperatively attached to the clutch mechanism. The rotor, the stator, the windings, and the magnets comprise an electric machine operable as either an electric motor or an electric generator, and the electric machine is attachable to a power store. In the start position, (i) the clutch mechanism is disengaged from the replacement driven shaft, and (ii) the second mating mechanism of the clutch mechanism is matingly engaged with the hub mating mechanism of the hub of the replacement centrifugal clutch and thereby cooperatively engaged with the driving shaft of the internal combustion engine. In the neutral position, the clutch mechanism is disengaged from (i) the replacement driven shaft and (ii) the hub of the replacement centrifugal clutch and thereby disengaged from the driving shaft of the internal combustion engine. In the drive position, (i) the clutch mechanism is disengaged from the hub of the replacement centrifugal clutch and thereby disengaged from the driving shaft of the internal combustion engine, and (ii) the second mating mechanism of the clutch mechanism is matingly engaged with the driven shaft mating mechanism and thereby matingly engaged with the replacement driven shaft of the internal combustion engine. In the start position, the electric machine is operable as the electric motor to rotate the hub of the replacement centrifugal clutch to thereby rotate the driving shaft to start the engine. In the neutral position, driving the driving shaft to rotate the replacement centrifugal clutch to at least the threshold speed causes the rotor to rotate through the frictional engagement between the drum and the flyweights, to thereby operate the electric machine as the generator to produce electricity. In the drive position, either: (i) the apparatus is operable in a pure electric drive mode, wherein the electric machine is operable as the electric motor to drive the replacement driven shaft clockwise or counter clockwise to thereby propel a vehicle comprising the apparatus forward or reverse by electric propulsion only; or (ii) driving the driving shaft to rotate the replacement centrifugal clutch to at least the threshold speed causes rotation of (a) the rotor through the frictional engagement between the drum and the flyweights, and (b) the replacement driven shaft through the mating engagement between the second mating mechanism of the clutch mechanism and the driven shaft mating mechanism of the replacement driven shaft, the apparatus operable either in a hybrid propulsion mode during which both the engine and the electric machine operating as the electric motor drive the replacement driven shaft, or in a propulsion/generation mode during which only the engine drives the replacement driven shaft and the electric machine operates as the electric generator to produce the electricity.

BRIEF DESCRIPTION OF THE DRAWINGS

Various aspects will now be described by way of example only, with reference to the appended drawings in which.

DETAILED DESCRIPTION OF VARIOUS EMBODIMENTS

Figure 1A:
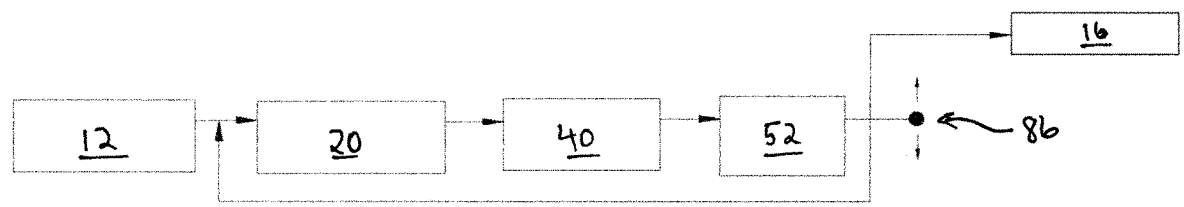
FIG. 1A depicts a general schematic diagram of an embodiment of the presently described subject-matter.
Figure 1B:
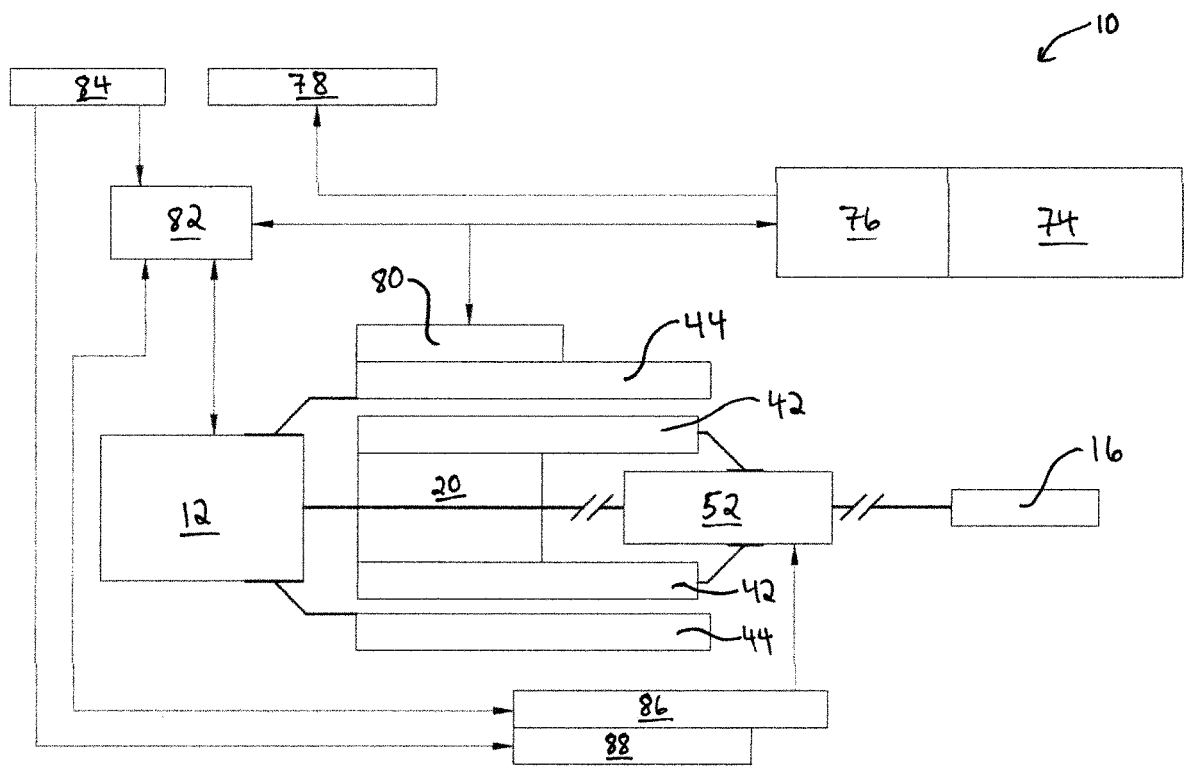
FIG. 1B depicts a more detailed schematic diagram of the schematic diagram shown in FIG. 1A.

With reference to the figures (in which the arrows may depict both signal/communication flow and power flow), in an example embodiment there is provided a hybrid electric/combustion propulsion and electric generator apparatus 10. Apparatus 10 may comprise an internal combustion engine 12, a driving shaft 14 (such as a crankshaft 14), a driven shaft 16 comprising a driven shaft mating mechanism 18, and a centrifugal clutch 20. The centrifugal clutch 20 may be positioned between the driving shaft 14 and the driven shaft 16.

Figure 7:
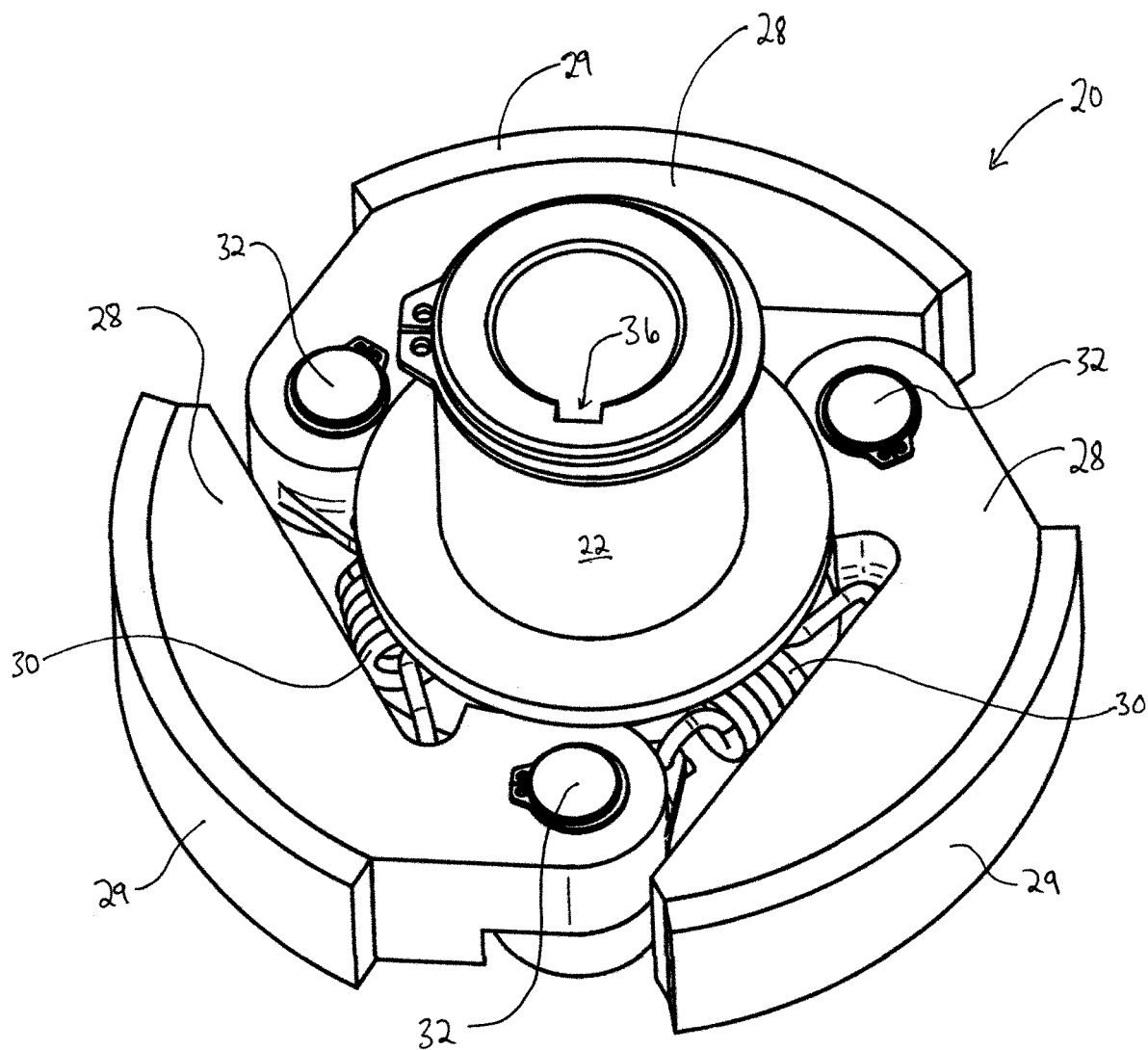
FIG. 7 depicts a top perspective view of an embodiment of a centrifugal clutch, shown without the drum.
Figure 8:
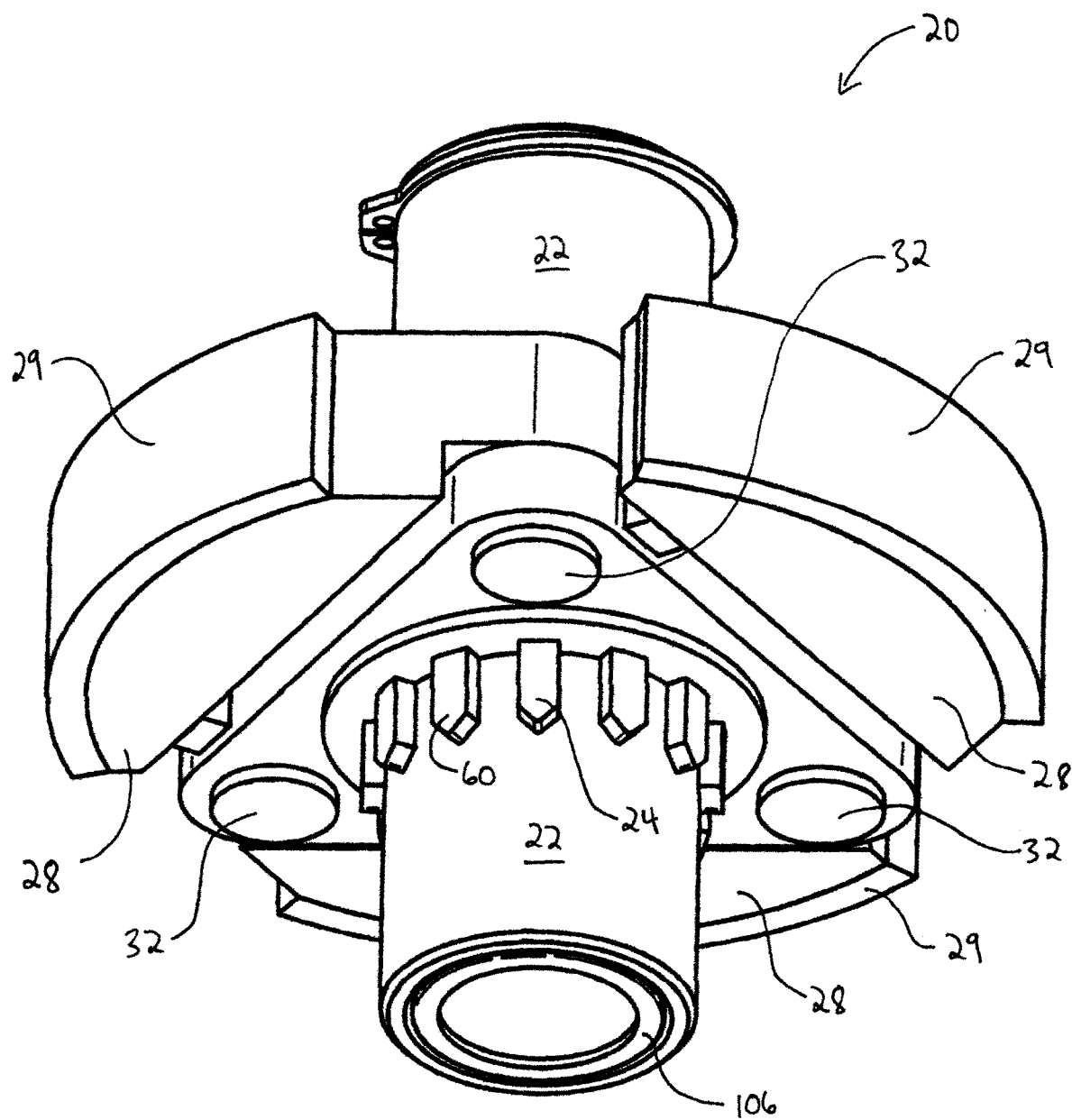
FIG. 8 depicts a bottom perspective view of the centrifugal clutch shown in FIG. 7.

As shown more clearly in FIGS. 7 and 8, in an embodiment, the centrifugal clutch 20 may comprise a central hub 22. The central hub 22 may comprise a hub mating mechanism 24, such that the central hub 22 is also the hub mating mechanism 24 or has the hub mating mechanism 24 integrally formed thereon or therein, or the hub mating mechanism 24 may be a separate component attached to the hub 22. The centrifugal clutch 20 may further comprise a drum 26 about the hub 22. The drum 26 may comprise a generally circular shape. The centrifugal clutch may further comprise spring-loaded flyweights or shoes 28 between the hub 22 and the drum 26. Each flyweight 28 may comprise a frictional surface 29, and may be pivotally attached by respective pivot members 32 to a mount plate 34 through which the hub 22 centrally passes. The centrifugal clutch 20 may further comprise other components commonly found in centrifugal clutches, such as a bushing, sprocket, dust cover, and any other components which may be required for the proper functioning of the centrifugal clutch 20 (not shown). Furthermore, the centrifugal clutch 20 may take on other forms of centrifugal clutch than that shown in the figures. For example, while the figures depict each spring 30 attaching flyweights 28 to each other, in other applications each spring 30 may attach a respective flyweight 28 to the hub 22, such that each flyweight 28, when subjected to centrifugal force, slides radially outward from the hub 22 to thereby stretch the respective attached spring 30. Yet other forms of centrifugal clutches 20, not described or shown herein, may be used.

Further, the driving shaft 14 may be matingly engaged with the hub 22, such as by a keyed connection via keyway 36 (see, e.g., FIG. 7) and a corresponding key or mating component on the driving shaft 14 (not shown), although any suitable mechanism for achieving the mating engagement between the driving shaft 14 and the hub 22 may be used. The mating engagement between the driving shaft 14 and the hub 22 is such that rotation of the driving shaft 14 causes rotation of the hub 22 and thus rotation of the centrifugal clutch 20, to thereby rotate the spring-loaded flyweights 28 which, once the rotation of the centrifugal clutch 20 is at or beyond a threshold speed, move, under centrifugal force, outward (i.e., away from the hub 22), such as radially outward from the hub 22, until the flyweights 28 frictionally engage (via their frictional surfaces 29) the drum 26 (such as a frictional lining 38 of the drum 26) to thereby cause rotation of the drum 26. The drum 26 may comprise steel or a steel alloy, and the drum 26 need not comprise a frictional lining 38; rather, it may be that only each of the flyweights or shoes 28 comprises a frictional surface 29.

Figure 15:
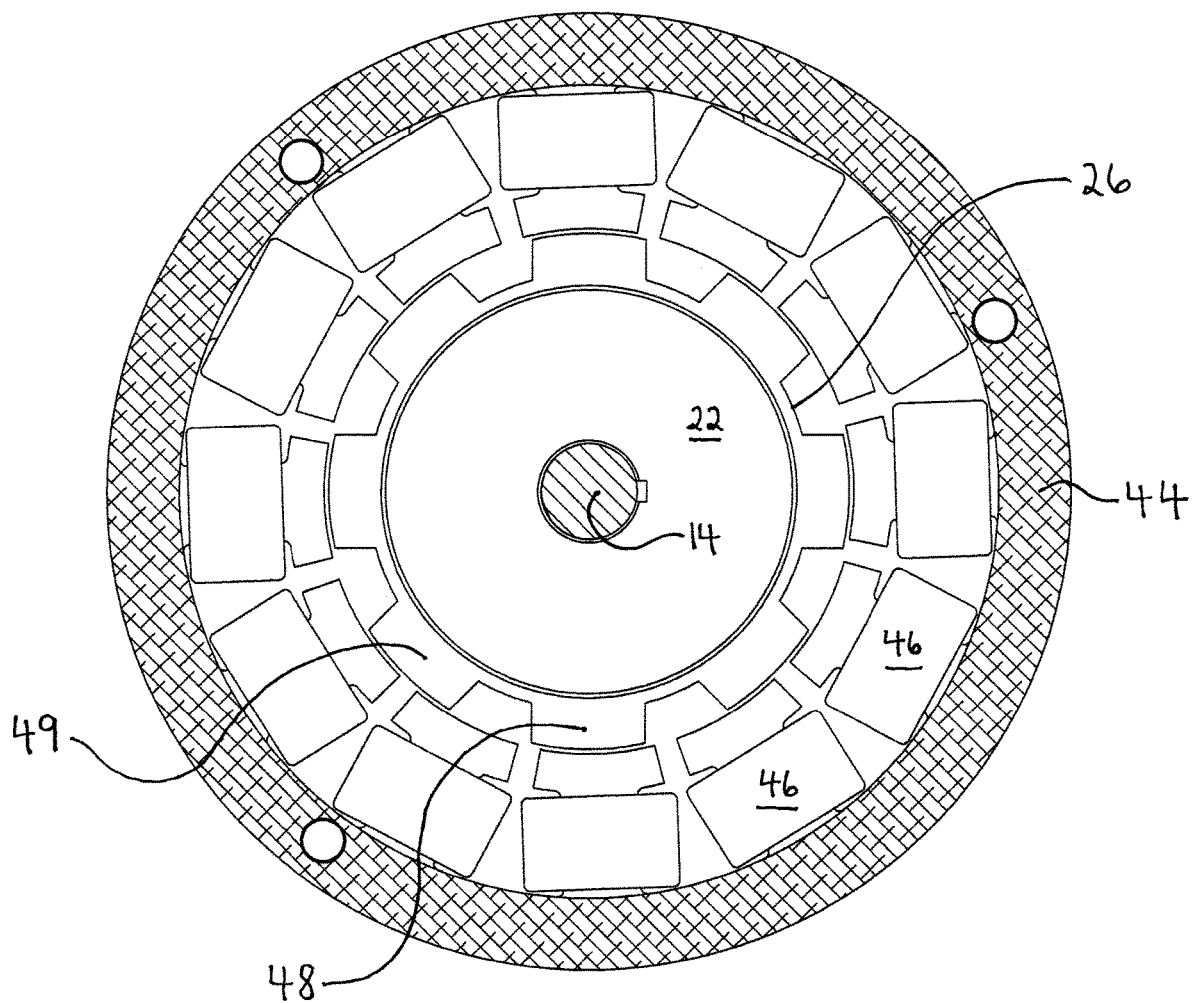
FIG. 15 depicts a partial top view of an electric machine, shown without the stator, and showing mating attachment of the driving shaft to the hub of the centrifugal clutch, in accordance with an embodiment.

The apparatus 10 may further comprise an electric machine 40, attachable to a power store 74, operable as either an electric motor 40 or an electric generator 40. The electric machine 40 may comprise a rotor 42, a stator 44, and windings 46 comprising an electrically conductive material, such as copper, on one of the rotor 42 and the stator 44. In an embodiment, the rotor 42 may comprise a rotor inner core 43 which comprises rotor windings 46 (or, e.g., a steel construction where, e.g., the electric machine 40 comprises a squirrel cage inductance motor 40), in which case the electric motor 40 may comprise an inductance motor 40. The rotor inner core 43 may comprise an integral part of the rotor 42, or may be fixedly attached to the rotor 42. With reference to FIG. 15, in other embodiments, the stator 44 may comprise stator windings 46, in which case the rotor 42 may comprise a plurality of evenly spaced permanent magnets (such as on or integrated into the rotor inner core 43, which may comprise an outer permitter of the clutch drum 26), in which case the electric motor 40 may comprise a brushless direct current (BLDC) motor, or, as shown in the example electric motor 40 depicted in FIG. 15, the rotor 42 may comprise a plurality of evenly spaced protrusions or laminations 48, each comprising a ferromagnetic material, in which case the electric motor 40 may comprise a switched reluctance motor (SRM). Any suitable magnets 49 for operation of the electric motor or generator 40 may be used. It will be appreciated that the apparatus 10 may comprise any electric machine 40 comprising a stator 44, windings 46, magnets 49, and a rotor 42 integrated with or attached to a centrifugal clutch drum 26, and that the inductance, BLDC and SRM motors described above (including the specific SRM motor 40 shown in FIG. 15, comprising a 12-pole stator and an 8-pole rotor) comprise examples only of types of possible motors. Generally, apparatus 10 may comprise any electric machine 40 capable of functioning as both an electric motor 40 and an electric generator 40.

It will be appreciated that electric machines 40 that are required to supply energy to rotor windings or coils 46 would require brushes and collector rings, which may result in a more complex design. Furthermore, the presence of electric current circulating in rotor windings 46 would create additional heat, beyond the heat produced by the centrifugal clutch 20, which may make it more difficult to cool the apparatus 10 and connected components. Using stator windings 46, as opposed to rotor windings 46, is expected to allow for a simpler design, as it would avoid the need for a collector to bring electricity to the motor 40, and therefore also avoid the wear commonly seen with collectors. Furthermore, because the stator 44 is a stationary component (i.e., does not rotate, as does the rotor 42), it is expected that the stator 44 would be easier to cool than the rotor 42, such as by liquid cooling, if necessary.

Components known in the art that are required for operation of any suitable type of electric machine 40 may be used with apparatus 10. For example, a BLDC or SRM motor 40 would require an electric commutator between the electric machine 40 and an attached battery 74.

Figure 14:
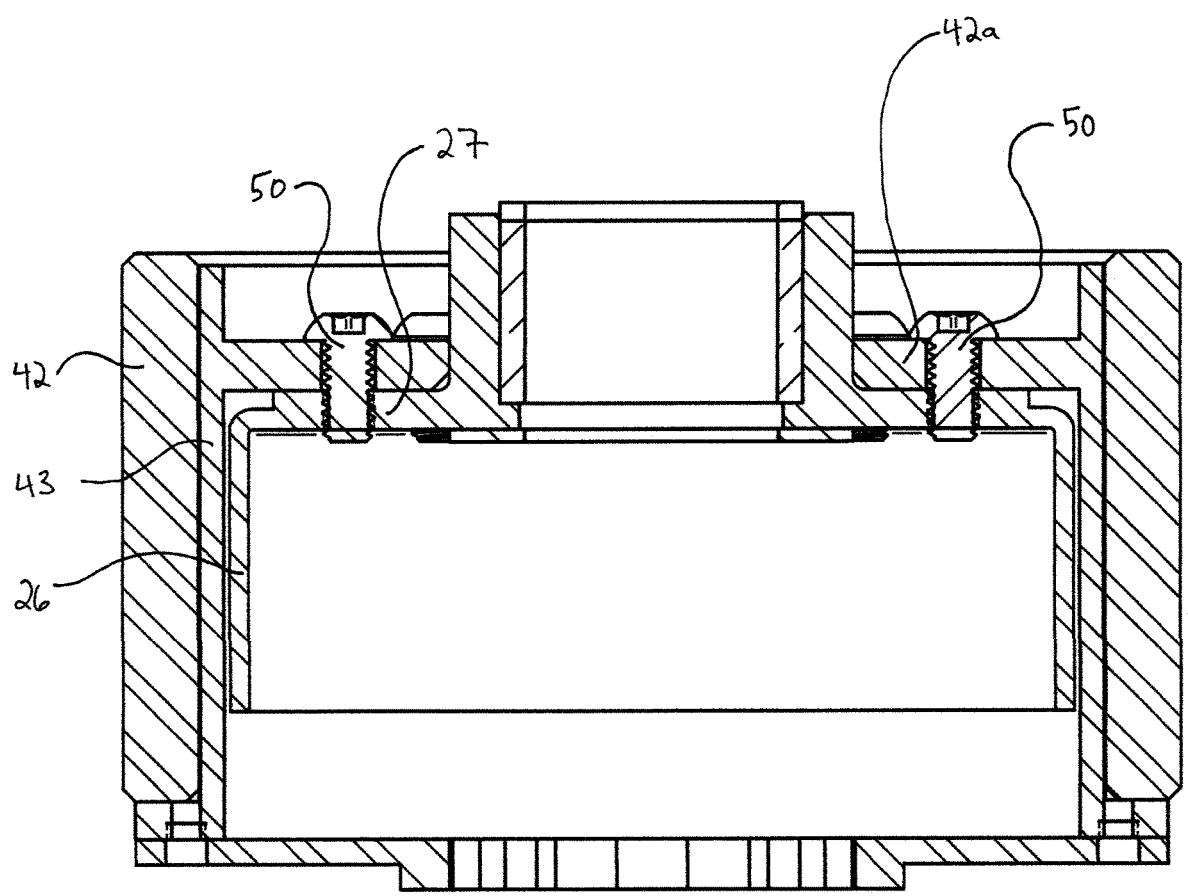
FIG. 14 depicts a side view of a partial cross-section of an embodiment of the presently described subject-matter, showing the mating attachment of the rotor to the drum.

The rotor 42 may comprise the drum 26, such that rotation of the drum 26 similarly rotates the rotor 42, and rotation of the rotor 42 similarly rotates the drum 26. In some embodiments, and as shown in the figures, the drum 26 and the rotor 42 may be matingly attached to one another, as shown in FIG. 14, such as via a plurality of fasteners 50, each of which may comprise, for example, a rigid fastener, or a flexible fastener such as a rubber bushing 50. The fasteners 50 may comprise threaded fasteners (which are typically rigid), attaching the rotor 42 (such as the rotor inner core 43) to the drum 26, for example by attachment of a drum flange portion 27 of the drum 26 and a rotor flange portion 42a of the rotor 42 (such as of the rotor inner core 43). Where flexible fasteners 50 are used, such as rubber bushings 50, it is expected that such flexible connections may isolate or mitigate against the effects of vibrations from the engine 12, and allow for slight misalignment between the drum 26 and the rotor 42, 43.

Figure 9:
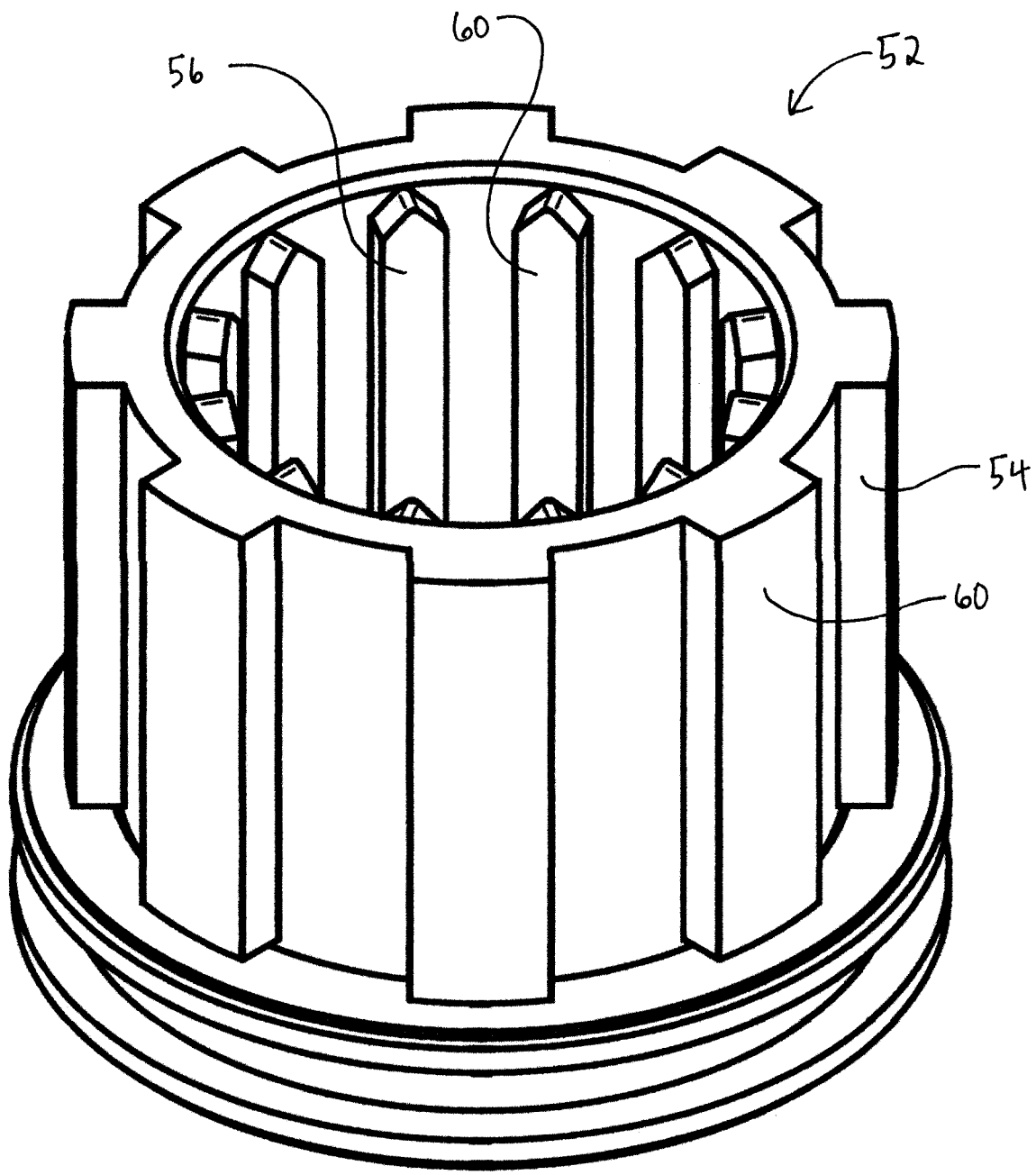
FIG. 9 depicts a top perspective view of an embodiment of a dog clutch.
Figure 10:
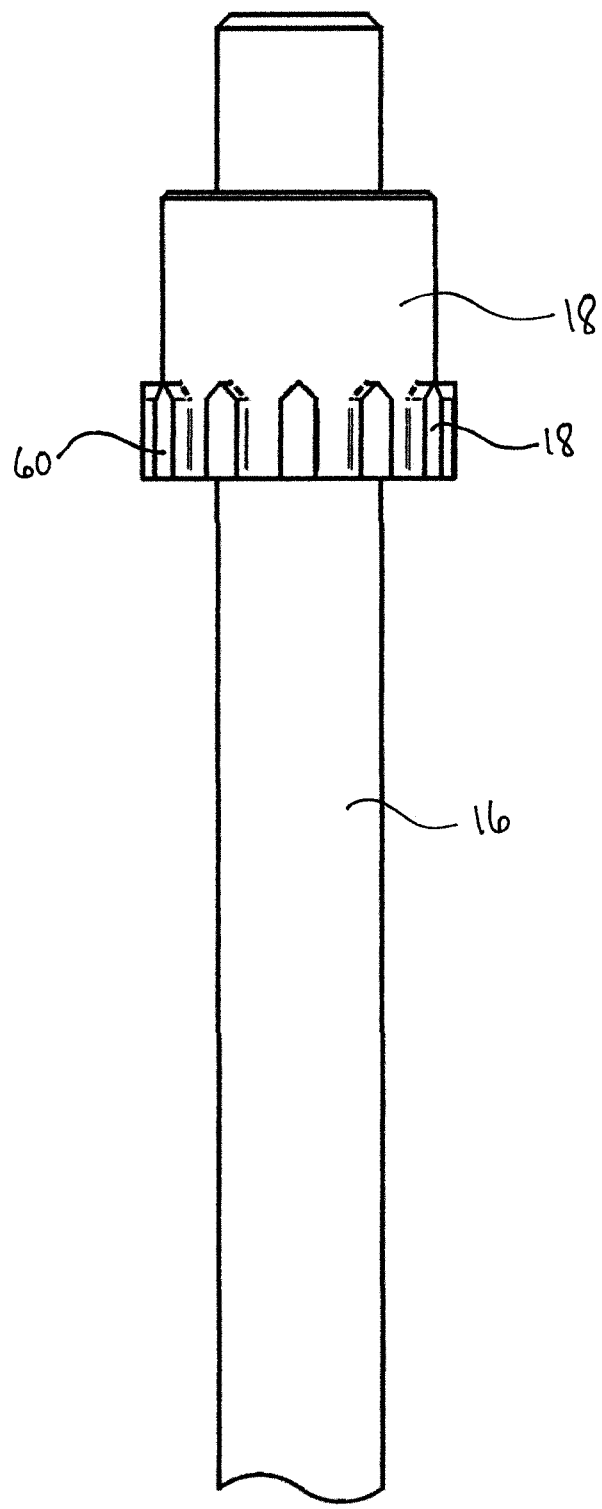
FIG. 10 depicts a partial side view of an embodiment of a driven shaft.

The apparatus 10 may further comprise a single non-friction-based clutch mechanism 52. With reference to FIG. 9, the clutch mechanism 52 may comprise a first mating mechanism 54 and a second mating mechanism 56. The clutch mechanism 52 may, for example, comprise a clearance fit clutch mechanism, such as a dog clutch 52, and may be cooperatively engaged with the drum 26 of the centrifugal clutch 20 and the rotor 42 of the electric machine 40 by the first mating mechanism 54. For example, the cooperative engagement between the clutch mechanism 52 and the drum 26 and rotor 42 may be achieved through mating engagement between the clutch mechanism 52 (such as by its first mating mechanism 54) with a torque plate 58 to which the rotor 42 (such as the rotor inner core 43) and the drum 26 is attached, as shown in FIG. 6.

In an embodiment, each of the driven shaft mating mechanism 18, the hub mating mechanism 24, the first mating mechanism 54 of the clutch mechanism 52, and the second mating mechanism 56 of the clutch mechanism 52, may comprise a plurality of tooth members 60, and the tooth members 60 of each of the driven shaft mating mechanism 18 and the hub mating mechanism 24 may be capable of mating engagement with the tooth members 60 of the second mating mechanism 56 of the clutch mechanism 52. To facilitate such mating engagement, ends of the respective tooth members 60 that face one another during the mating engagement may be tapered, as shown in the figures, so as to facilitate alignment between opposing tooth members 60.

Figure 6:
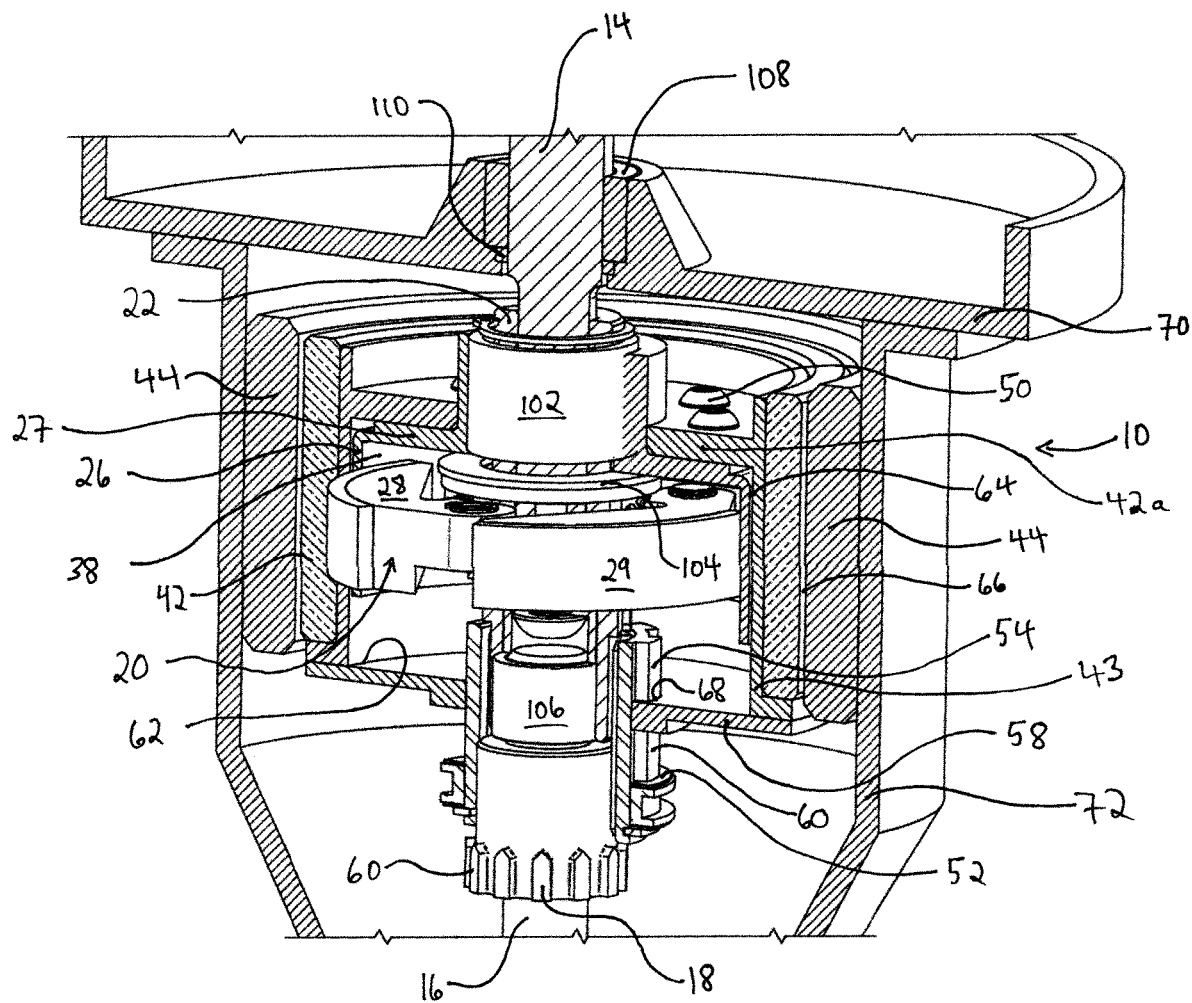
FIG. 6 depicts a side perspective view of a partial cross-section of an embodiment of the presently described subject-matter.

As described above, the apparatus 10 may further comprising a torque plate 58 fixedly attached, e.g. about a perimeter of the torque plate 58, to an end of the rotor 42 or the drum 26, as shown at connection 62 shown in FIG. 6. For example, the torque plate 58 may be attached to an end of the rotor inner core 43, e.g. where the rotor inner core 43 is rigidly connected to the drum 26 of the centrifugal clutch 20 by rigid fasteners 50 (as may be seen in simpler and smaller applications of the presently described subject-matter), or the torque plate 58 may be attached to the drum 26 of the centrifugal clutch 20, e.g. where the rotor 42 or rotor inner core 43 is connected to the drum 26 via flexible fasteners 50 (such as rubber bushings 50), in which case the rotor 42, 43 may be held in place by bearings located in the same housing as the stator 44 (as may be seen in larger and more sophisticated applications of the presently described subject-matter), such as the clutch mechanism and electric machine housing 72 shown in FIG. 6, which may allow for a more precise positioning of the rotor 42 and the stator 44 to reduce the air gap 66 or running clearance therebetween, which may increase efficiency of the electric machine 40. In this case, the rubber bushings or flexible fasteners 50 may be particularly beneficial for larger and more sophisticated propulsion systems where the rotor bearings are located in the housing 72, as the flexible fasteners 50 may allow for slight misalignment between the rotor 42 and the drum 26.

With reference to FIG. 6, in an embodiment, the plurality of tooth members 60 of the first mating mechanism 54 of the clutch mechanism 52 may be received within corresponding recesses 68 formed concentrically about a center of the torque plate 58 about the clutch mechanism 52, the recesses 68 being sized and shaped to slidably retain the tooth members 60 of the first mating mechanism 54 therein, such that the clutch mechanism 52 is slidable generally through the center of the torque plate 58. As shown in FIG. 6, terminal ends of the tooth members 60 of the first mating mechanism 54 need not be tapered, as the clutch mechanism 52 is slidably retained within the recesses 68 in all operating configurations, as described in further detail below.

The apparatus 10 may comprise an air gap 64 between the centrifugal clutch drum 26 and the rotor 42, which is expected to shield inner components of the centrifugal clutch 20 (such as the flyweights or shoes 28) from the magnetic field of the electric machine 40. As briefly described above, the apparatus 10 may also comprise a second air gap 66 between the rotor 42 and the stator 44. Maintaining the second air gap 66, between the rotor 42 and the stator 44, as small as possible is expected to increase efficiency of the electric machine 40. An air gap, such as the second air gap 66, provides the necessary clearance between adjacent components that are in relative motion to account for manufacturing tolerances and possible thermal expansion, to prevent the seizing of such components, as may occur when there is no running clearance or air gap between the moving components. For example, with no running clearance or second air gap 66, the rotor 42 could seize in the stator 44, particularly as the components heat up and slightly expand. Since the air gap 66 is not ferromagnetic, the presence of the air gap 66 increases the reluctance of the magnetic circuit which decreases the magnetic flux responsible for the operation of the electric machine 40 (i.e., the same electric motor 40 fed by the same electric power, but with a bigger air gap 66, develops less mechanical power, and the same electric generator 40, driven by the same torque and speed (mechanical power), but with a bigger air gap 66, develops less electrical power), and so it is desirable to minimize the air gap 66 as much as possible while still providing sufficient running clearance to avoid seizing of the rotor 42 within the stator 44.

The electric machine 40 may be connected by known connection means to one or more batteries (collectively, "battery") or a power store 74, as an electric power source, a battery management system 76, and power electronics 80. The battery management system 76 may in turn be connected to an external load 78. A control unit 82, with an interface for a user or operator 84 of a vehicle comprising the apparatus 10, may be connected by known connection means to the battery management system 76, the power electronics 80, the internal combustion engine 12 (which may include one or more sensors for monitoring engine parameters and providing feedback thereon to the control unit 82), and a single operating mode selection mechanism or clutch mechanism actuator 86 for cooperative attachment to the clutch mechanism 52. As is known in the art, the power electronics 80 may comprise the solid-state electronics that control and convert the electric power from the electric machine 40 into a suitable form for use. The power electronics 80 may control both unidirectional and bidirectional flow of power/energy, depending on whether the electric machine 40 is used as an electric motor 40 or an electric generator 40. It will be appreciated that each type of electric machine 40 (e.g., brushed or brushless direct current, switched reluctance, induction, etc.) would require its own specific power electronics 80 that is suitable for the type of electric machine 40 used.

The operating mode selection mechanism 86 may, in simpler applications, comprise a manually activated mechanism, such as a lever, or in more complex applications, comprise an automatic mechanism (such as an electric actuator, which may receive power from the battery 74 and be controllable via the control unit 82, and which may be overridden, in the event of a failure thereof, by a manual override mechanism 88 that is operable by the operator 84.

Figure 2A:
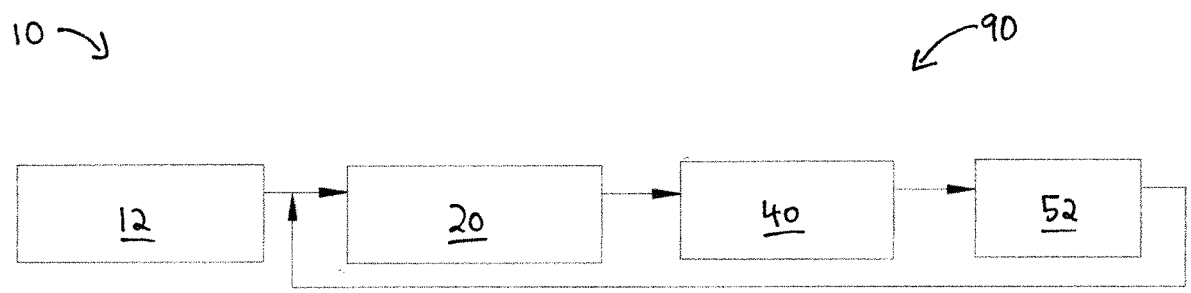
FIG. 2A depicts a general schematic diagram of an embodiment of the presently described subject-matter in a start position.
Figure 2B:
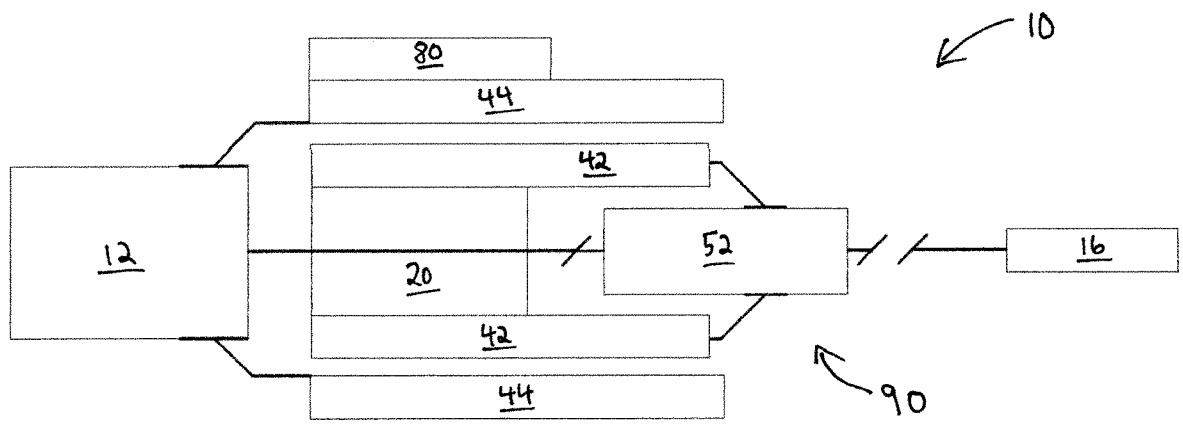
FIG. 2B depicts a more detailed schematic diagram of the schematic diagram shown in FIG. 2A.
Figure 3A:
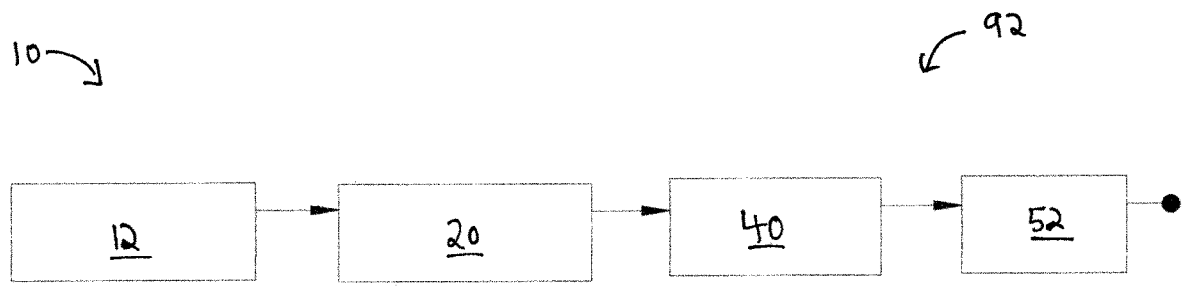
FIG. 3A depicts a general schematic diagram of an embodiment of the presently described subject-matter in a neutral position.
Figure 3B:
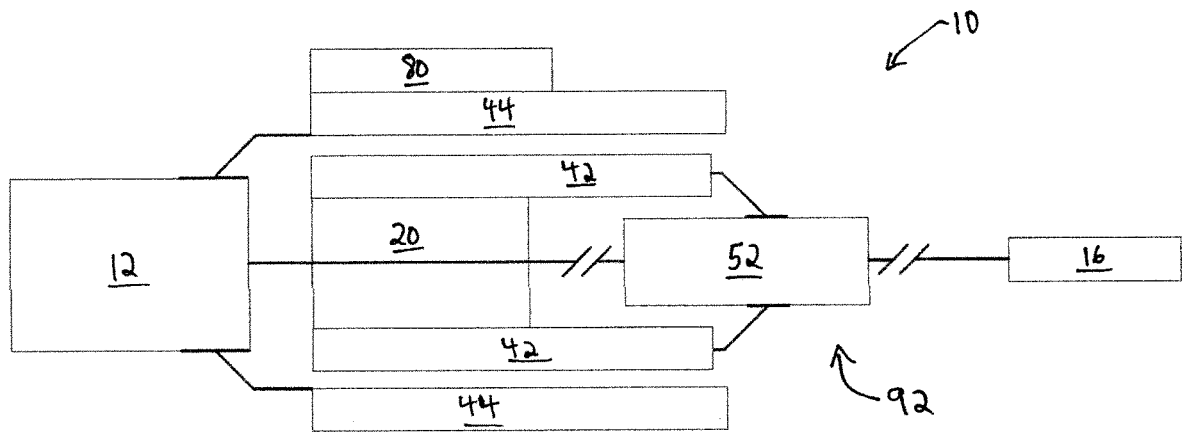
FIG. 3B depicts a more detailed schematic diagram of the schematic diagram shown in FIG. 3A.
Figure 4A:
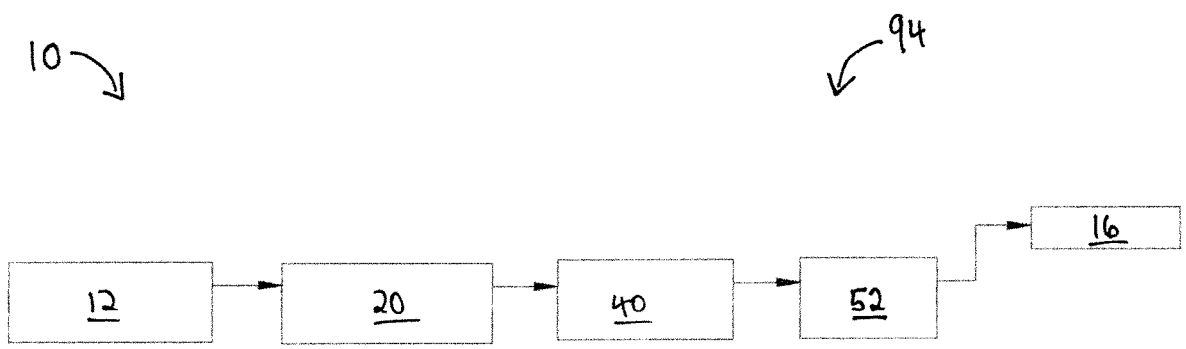
FIG. 4A depicts a general schematic diagram of an embodiment of the presently described subject-matter in a drive position.
Figure 4B:
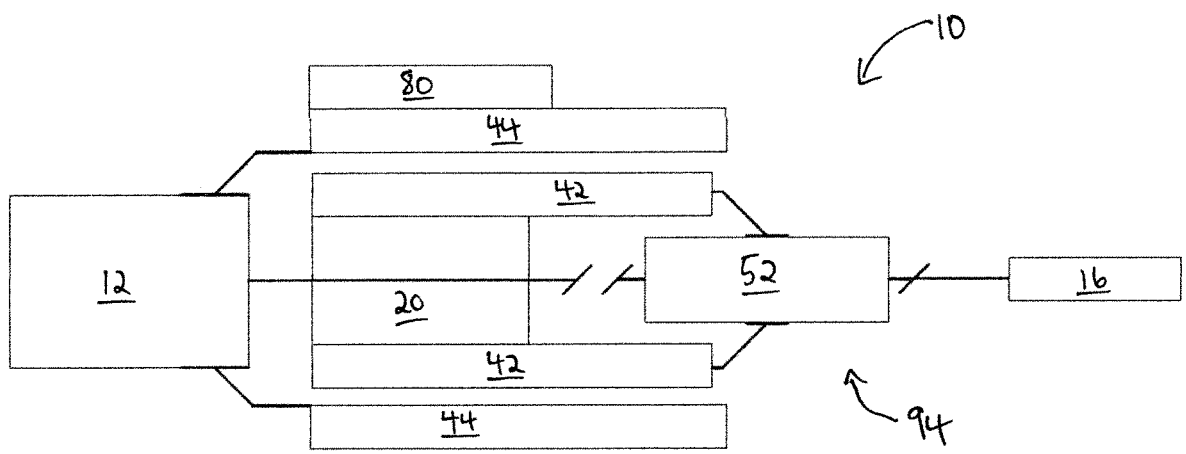
FIG. 4B depicts a more detailed schematic diagram of the schematic diagram shown in FIG. 4A.
Figure 11:
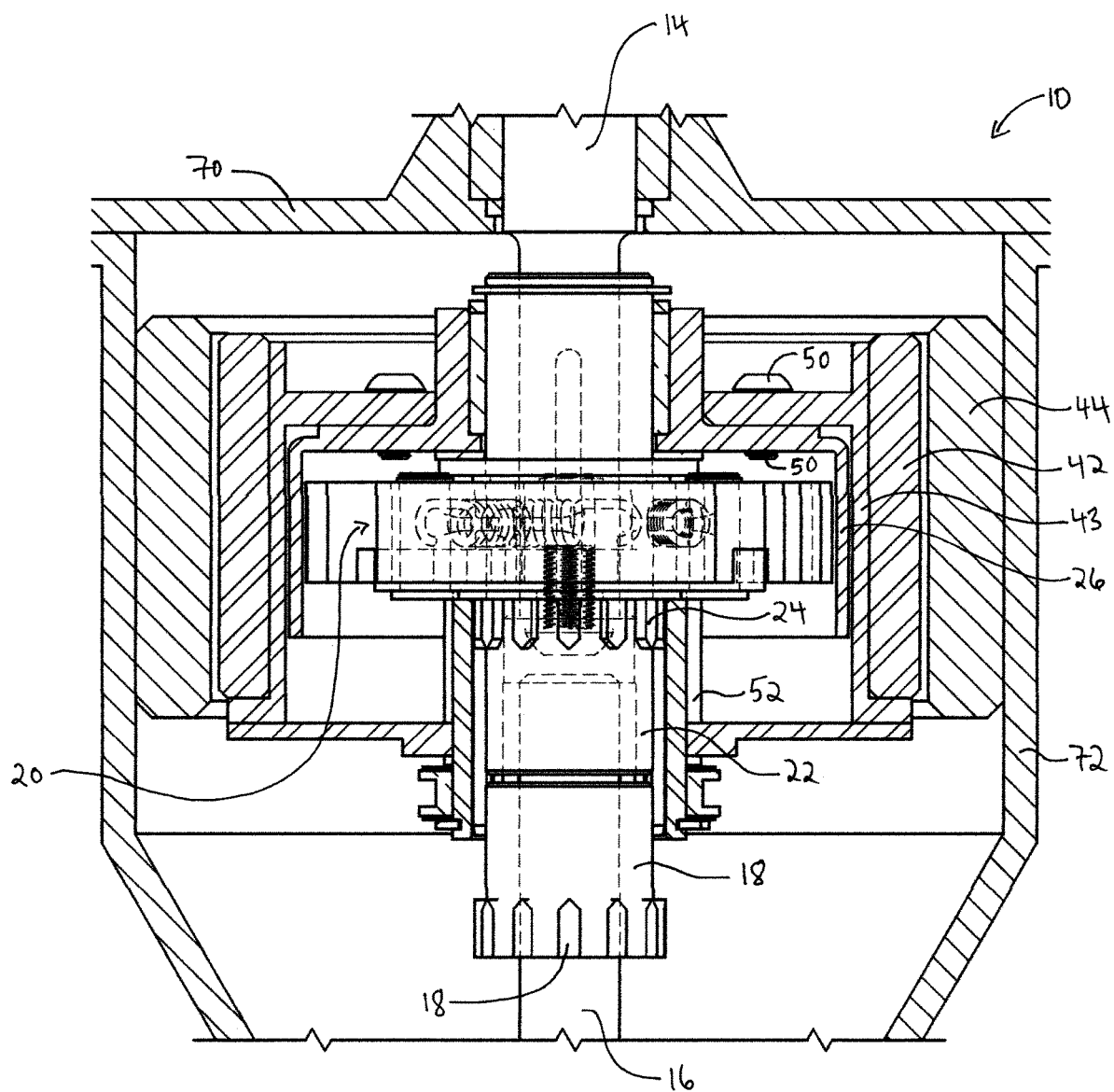
FIG. 11 depicts a side view of a partial cross-section of an embodiment of the presently described subject-matter in a start position.
Figure 12:
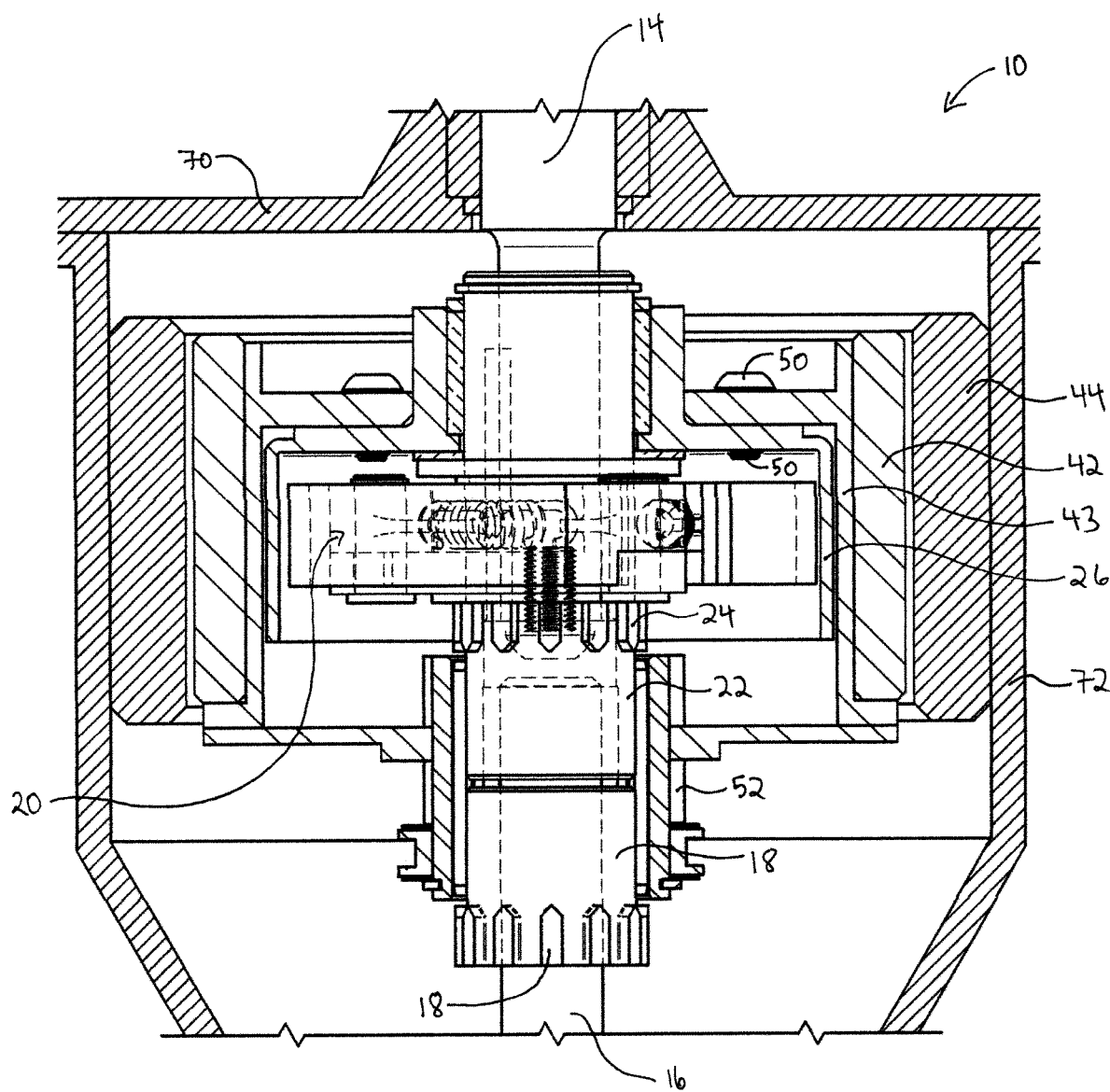
FIG. 12 depicts a side view of a partial cross-section of an embodiment of the presently described subject-matter in a neutral position.
Figure 13:
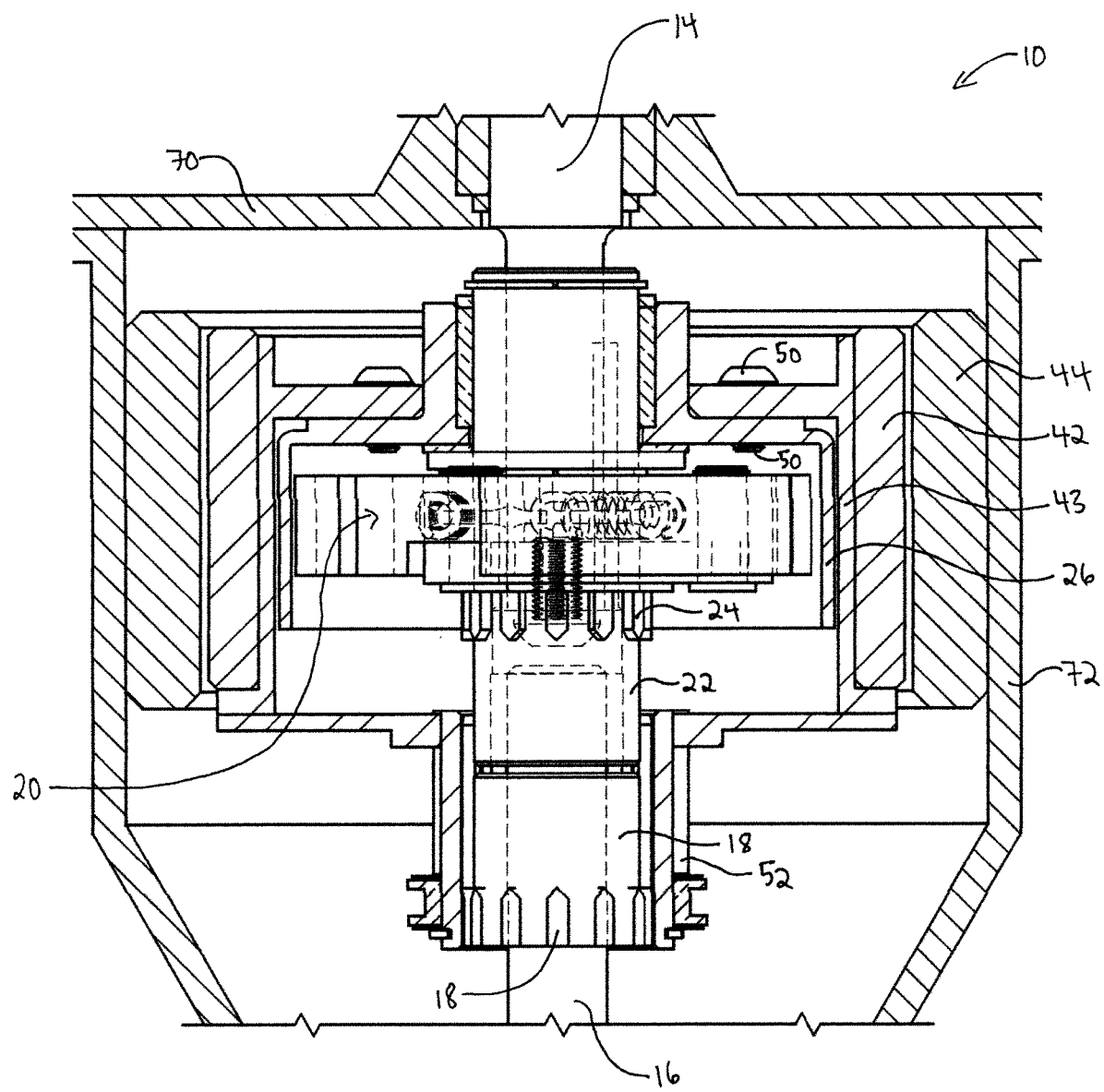
FIG. 13 depicts a side view of a partial cross-section of an embodiment of the presently described subject-matter in a drive position.

Through the apparatus 10, selection of any one of three modes of operation of a vehicle comprising the apparatus 10 may be accomplished through the operating mode selection mechanism 86. In particular, the single operating mode selection mechanism 86 may be actuated to axially slide the clutch mechanism 52 into one of (i) a start position 90 (see FIGS. 2A, 2B and 11), (ii) a neutral position 92 (see FIGS. 3A, 3B, and 12), and (iii) a drive position 94 (see FIGS. 4A, 4B and 13). In FIGS. 1B, 2B, 3B, and 4B, a single slash ("/") denotes a mating connection between the components on either side thereof, and a double slash ("//") denotes that there is no mating connection between the components on either side thereof. More particularly, the single slash ("/") denotes that the clutch mechanism 52 is matingly engaged with to the component on the other side of the single slash ("/"), and the double slash ("//") denotes that the clutch mechanism 52 is not matingly engaged with, or is disengaged from, the component on the other side of the double slash ("//").

In the start position 90: (i) the clutch mechanism 52 is disengaged from the driven shaft 16, and (ii) the second mating mechanism 56 of the clutch mechanism 52 is matingly engaged with the hub mating mechanism 24 of the hub 22 of the centrifugal clutch 20 and thereby cooperatively engaged with the driving shaft 14 of the internal combustion engine 12. As such, through connection of the electric machine 40 to a power source 74, such as a battery 74, in the start position 90, the electric machine 40 is operable as an electric motor 40 to rotate the hub 22 of the centrifugal clutch 20, to thereby rotate the driving shaft 14 to start the engine 12. As such, the apparatus 10 is expected to provide for a purely electric start of the engine 12 when the clutch mechanism 52, such as a dog clutch 52, is slid by the single operating mode selection mechanism 86 into the start position 90.

In the neutral position 92, the clutch mechanism 52 is disengaged from both (i) the driven shaft 16 and (ii) the hub 22 of the centrifugal clutch 20 and thereby disengaged from the driving shaft 14 of the internal combustion engine 12. As such, in the neutral position 92, driving the driving shaft 14 (such as a crankshaft 14) to rotate the centrifugal clutch 20 to at least the threshold speed causes the rotor 42 to rotate through frictional engagement between the drum 26 (to which the rotor 42 is attached or with which the rotor 42 is integrally formed) and the flyweights 28, to thereby operate the electric machine as a generator 40 to produce electricity, to, e.g., recharge an attached battery 74 and/or provide power to an external load 78 (such selection between recharging of a battery 74 and providing power to an external load 78 may, e.g., be automatically determined by the battery management system 76, which may be configured to direct the generated electricity to the battery 74 for recharging when the battery 74 is below a certain charge level, for example). As such, the apparatus 10 is expected to provide for electric generation through the electric generator 40, by simply driving the centrifugal clutch 20 to its threshold speed to thereby rotate the drum 26 and the attached or integral rotor 42 which, through rotation of magnets attached to or integrally formed with, e.g., the rotor 42, as described above, causes relative motion between such magnets and the windings 46 on, e.g., the stator 44, to cause electric generation by the electric generator 40 when the clutch mechanism 52, such as a dog clutch 52, is slid by the single operating mode selection mechanism 86 into the neutral position 90.

In the drive position 94: (i) the clutch mechanism 52 is disengaged from the hub 22 of the centrifugal clutch 20 and thereby disengaged from the driving shaft 14 of the internal combustion engine 12, and (ii) the second mating mechanism 56 of the clutch mechanism 52 is matingly engaged with the driven shaft mating mechanism 18 and thereby matingly engaged with the driven shaft 16 of the internal combustion engine 12. In the drive position 94, the apparatus 10 is operable in either: (I) a pure electric drive mode, or (II) a non-pure electric drive mode which itself comprises two propulsion modes, (A) a hybrid propulsion mode, and (B) a propulsion/generation mode.

The electric machine 40 may be capable of four-quadrant operation. That is, the electric motor 40 may operate in both directions of rotation and may both propel and produce electrical generation. During propulsion, the electric machine 40 works as an electric motor 40 to propel a vehicle comprising the apparatus 10 when the clutch mechanism 52 is in the drive position 94. During braking, the electric machine 40 works as an electric generator 40 to convert mechanical energy (from braking, whether during forward or reverse propulsion) into electrical energy. In other words, the electric machine 40 may be capable of forward braking/electrical generation, forward propulsion, reverse braking/electrical generation, and reverse propulsion.

As described above, when the clutch mechanism 52 (e.g., a dog clutch 52) is in the drive position 94, the apparatus 10 is operable in a pure electric drive mode, in which the electric machine 40 is operable as an electric motor 40 to drive, using energy/power provided by the power store 74, the driven shaft 16 either clockwise, or counter clockwise (by reversing the rotation of the electric motor 40) to thereby propel a vehicle comprising the apparatus 10 forward or reverse by electric propulsion only, via the electric motor 40. In this way, a vehicle comprising the apparatus 10 would not require a reverse gear and a related reverse gear actuation mechanism, and as such, the apparatus 10 may allow for a simplified engine and drivetrain design for a vehicle comprising the apparatus 10 (such as a marine outboard motor, as shown in the general schematic diagram in FIG. 5, in which the driven shaft 16 may drive a propeller shaft 96 by way of an intermediate bevel gear 98). A further benefit of obviating a reverse gear, particularly in marine applications (such as outboard motor applications), is that fewer components may allow for a smaller and potentially more hydrodynamic housing underwater. In the pure electric drive mode, the engine 12 can be off, or idling at any speed below the threshold speed, and as such, silent or substantially silent propulsion of a vehicle comprising the apparatus 10 may be achieved by pure electric propulsion, in forward or reverse. This may also be particularly beneficial in marine applications, where fully electric propulsion of a vehicle comprising the apparatus 10 would be desirable when trolling out of a marina, when the engine 12 is still warming up.

As described above, in the drive position 94 of the clutch mechanism 52 (such as a dog clutch 52), the apparatus 10 is also operable in a non-pure electric drive mode. In this mode, driving the driving shaft 14 to rotate the centrifugal clutch 20 to at least the threshold speed causes rotation of (a) the rotor 42 through frictional engagement between the drum 26 and the flyweights 28, and (b) the driven shaft 16 through the mating engagement between the second mating mechanism 56 of the clutch mechanism 52 and the driven shaft mating mechanism 18 of the driven shaft 16. In this non-pure electric drive mode, the apparatus is operable either (I) in the above-described hybrid propulsion mode, during which both the engine 12 and the electric machine 40 operating as an electric motor 40 drive the driven shaft 16, or (II) in the above-described propulsion/generation mode, during which only the engine 12 drives the driven shaft 16 and the electric machine 40 operates as an electric generator 40 to produce electricity which may, e.g., be supplied to an external load 78 or be used to recharge a battery 74 attached to the electric machine 40.

Selection of the hybrid propulsion mode or the propulsion/generation mode when the clutch mechanism 52 is in the drive position 94 may occur automatically by the control unit 82 connected to the apparatus 10. Such selection by the control unit 82 may be based on one or more factors, including, e.g., the charge remaining in the battery 74 connected to the electric machine 40, and the operator demand on the engine 12 (i.e., engine rpm or load). The control unit 82 may also receive inputs from the battery management system 76 on the state or condition of the battery, which may serve as a further input to the control unit 82 in the determination of whether to select the hybrid propulsion mode or the propulsion/generation mode.

As described above, and as shown in FIG. 6, the first mating mechanism 54 of the clutch mechanism 52 is slidably retained within the recesses 68 of the torque plate 58 in each of the start position 90, neutral position 92 and drive position 94, whereas the second mating mechanism 56 may or may not be matingly engaged to another component, depending on the operating configuration of the apparatus 10 (i.e., the second mating mechanism 56 is matingly engaged only with the hub mating mechanism 24 of the hub 22 of the centrifugal clutch 20 and thereby cooperatively engaged with the driving shaft 14 of the internal combustion engine 12 in the start position 90, and the second mating mechanism 56 is matingly engaged only with the driven shaft mating mechanism 18 and thereby matingly engaged with the driven shaft 16 of the internal combustion engine 12 in the drive position 94, whereas the second mating mechanism 56 is not matingly engaged with any other component in the neutral position 92).

The electric machine 40 may be operated as an electric motor 40 (such as by software programmed onto a non-transient computer-readable medium that is readable and executable by a processor of, e.g., the control unit 82, which software control may be triggered upon actuation of the operating mode selection mechanism 86 by an operator of the apparatus 10) to slowly rotate the clutch mechanism 52, via the cooperative connection between the first mating mechanism 54 of the clutch mechanism 52 and the rotor 42 of the electric machine 40 (such as by the mating engagement between the first mating mechanism 54 and the recesses 68 in the torque plate 58 fixedly attached to the rotor 42 (or the drum 26), as described above), to thereby facilitate alignment between the second mating mechanism 56 of the clutch mechanism 52 and the hub mating mechanism 24 or the driven shaft mating mechanism 18, to thereby matingly engage the clutch mechanism 52 with the hub 22 or the driven shaft 16, respectively. Such ability for slight and slow rotation of the clutch mechanism 52 via the electric motor 40, controlled and executed, e.g., automatically by software upon actuation of the operating mode selection mechanism 86 by an operator of the apparatus 10 (as described above), to facilitate mating engagement of the clutch mechanism's second mating mechanism 56 with mating mechanisms external to the clutch mechanism 52, may be particularly useful in facilitating such mating engagement where, e.g., the clutch mechanism's second mating mechanism 56, the hub mating mechanism 24 and/or the driven shaft mating mechanism 18 do not comprise features that themselves facilitate such mating engagement, such as the tapering of the tooth members 60 shown in the figures. Such software, when executed as described above, may cause the very slow rotation of the clutch mechanism 52 while shifting the clutch mechanism 52 into an engagement position (e.g., the start position 90 or the drive position 94), to facilitate the engagement, and once such engagement is achieved (as would be communicated to the control unit 82 and the software thereof by known feedback mechanisms, such as a sensor communicatively coupled with the control unit 82), the software control may cease.

Figure 5:
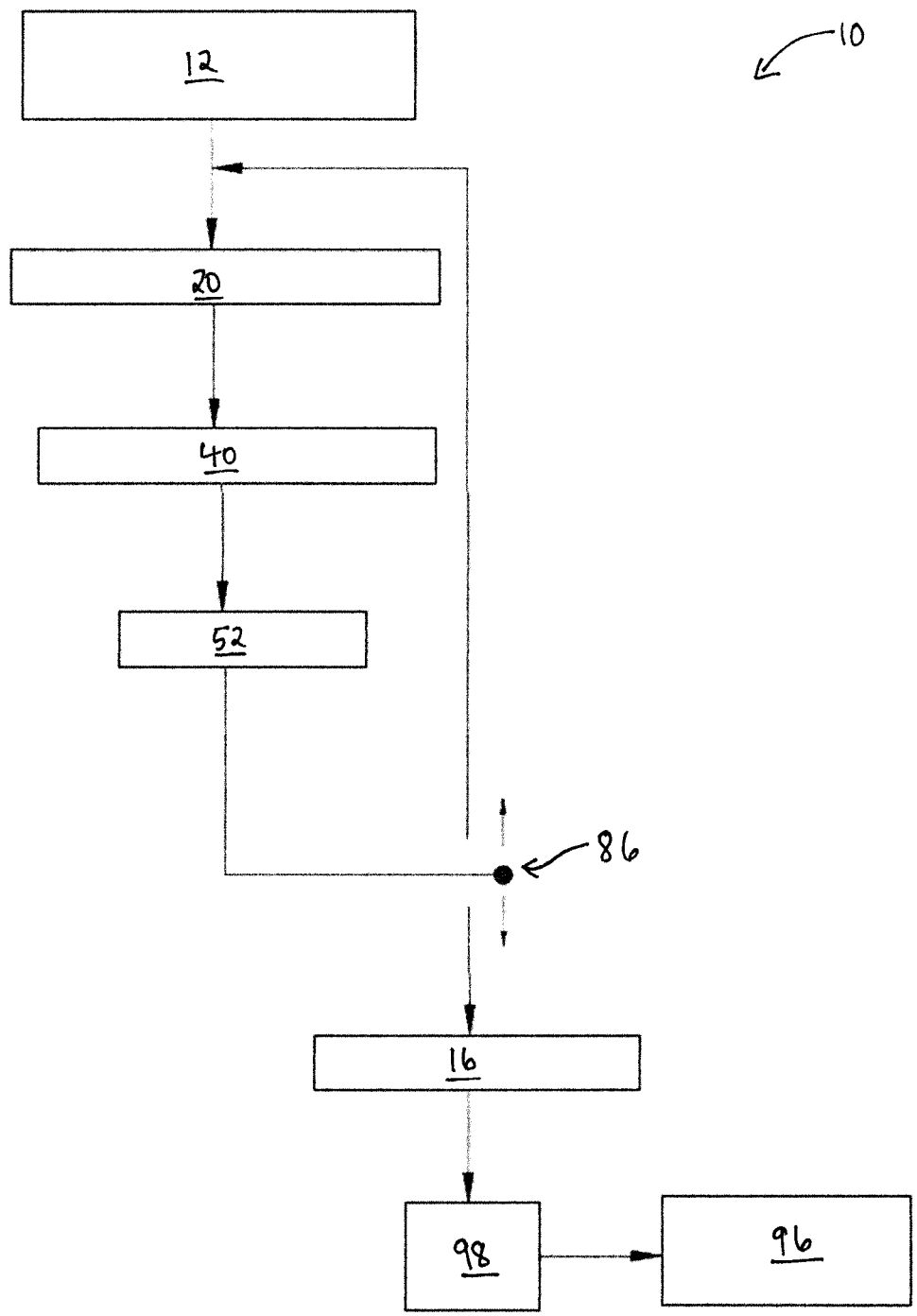
FIG. 5 depicts a general schematic diagram of another embodiment of the presently described subject-matter.

Apparatus 10 may be used with engines 12 comprising horizontal driven shafts 16, such as karts, RTV vehicles, or continuously variable transmission (CVT) vehicles in which the centrifugal clutch 20 and the clutch mechanism 52 may be located upstream of the CVT or drivetrain generally. Apparatus 10 may also be used with engines 12 comprising vertical driven shafts 16, such as those of outboard motors, such as the outboard motor of a marine vehicle, as shown in FIG. 5.

Although the figures depict the driving shaft 14, the hub 22, the clutch mechanism 52, and the driven shaft 16 being generally axially aligned, it will be appreciated that these components may not be axially aligned, and instead be capable or mating or cooperable engagement with one another via intermediate gearing or mating mechanisms that may axially offset one or more of these components from one another.

It will be appreciated that where it is described herein that the electric machine 40 is operated as an electric motor 40, a power source 74 would be required for the electric motor 40 in order to effect its operation, such as a battery 74 with sufficient charge for the required demand. The battery 74 can supply energy to the electric motor 40 to drive/rotate the driven shaft 16 in both directions when the clutch mechanism 52 (e.g., a dog clutch 52) is engaged with the driven shaft 16 (i.e., the above-described pure electric drive mode, allowing for silent or substantially silent operation of the apparatus 10), to drive a vehicle comprising the apparatus 10 in either forward or reverse using the electric motor 40 only (i.e., while the combustion engine 12 is off, or idling at any speed below the threshold speed of the centrifugal clutch 20), whereas without a battery 74, the apparatus may still operate as an internal combustion engine 12. The presence of a battery 74 allows the apparatus 10 to transmit more power to the driven shaft 16 using both the combustion engine 12 and the electric motor 40 during propulsion (i.e., the above-described hybrid propulsion mode), and/or the battery 74 to be recharged while propelling a vehicle comprising the apparatus 10, or during breaking of the vehicle, using the combustion engine 12 and the electric generator 40 (i.e., the above-described propulsion/generation mode). When operating as an electric generator 40, the presence of a battery 74 allows for the temporary withdrawal of more power than that produced by the combustion engine 12 and, if silent operation is desired, the electric machine 40 may be operated as an electric motor 40 and provide the sole source of power for a limited time, depending on the stored energy or charge remaining in the battery or power store 74.

It will be appreciated that the driven shaft mating mechanism 18, the hub mating mechanism 24, the first mating mechanism 54 of the clutch mechanism 52, and the second mating mechanism 56 of the clutch mechanism 52, may take on any suitable form of mating mechanism for achieving the various operating configurations described herein. For example, the internal teeth of the dog clutch 52, comprising the second mating mechanism 56, could alternatively comprise longitudinally projecting tapered members placed on either longitudinal end of the dog clutch 52, for receipt within correspondingly shaped and sized recesses on longitudinal ends of the driven shaft mating mechanism 18 and the hub mating mechanism 24 which face the dog clutch 52.

It will be appreciated that the clutch mechanism 52 may be slidable axially so as to be configurable into any of the operating configurations described herein (i.e., the start position 90, the neutral position 92 and the drive position 94) other than by way of the first mating mechanism 54 and the recesses 68 of the torque plate 58. Any mechanism suitable for such axial sliding of the clutch mechanism 52 into any of the start position 90, the neutral position 92 and the drive position 94 may be used.

The apparatus 10 may further comprise bearings to allow for relative motion between components, such as: the centrifugal clutch radial bearing 102 and thrust bearing 104 to allow for relative motion between the hub 22 and the drum 26; the radial bearing 106, which aligns the hub 22 of the centrifugal clutch 20 with the driven shaft 16, which assists in providing the required alignment for the axial sliding of the clutch mechanism 52 (e.g., a dog clutch 52) into mating engagement with the hub 22 (via mating engagement with the hub mating mechanism 24) and the driven shaft 16 (via mating engagement with the driven shaft mating mechanism 18) to allow for the shifting or sliding of the clutch mechanism 52 into each of the three different positions described herein, i.e. the start position 90, the neutral position 92 and the drive position 94; and a driving shaft bearing 108 about the driving shaft 14. There may also be a driving shaft oil seal 110, as shown in FIG. 6.

The driven shaft mating mechanism 18 and/or the hub mating mechanism 24 may be integrally formed with the driven shaft 16 and the hub 22 of the centrifugal clutch 20, respectively, or they may comprise separate components for retrofitting onto a driven shaft and hub of an existing engine with a centrifugal clutch, such as by welded connection or other known connection mechanisms or means suitable for the operations described herein. At least the driven shaft mating mechanism 18, the hub mating mechanism 24 (or the driven shaft 16 with integrally formed driven shaft mating mechanism 18, and the hub 22 with integrally formed hub mating mechanism 24), the rotor 42 (which may also include a rotor inner core 43) and integral, or attached, drum 26, stator 44, windings 46 (e.g., stator windings 46), magnets 49 (e.g., on or integral with the rotor 42), clutch mechanism 52, and operating mode selection mechanism 86 may also comprise separate components for upgrading or retrofitting an existing or original centrifugal clutch and engine, such as by bolted connection of the stator 44, concentrically about the rotor 42 and the drum 26, to an existing engine, such as by an engine block bottom mount plate 70. Further separate components for upgrading or retrofitting an existing engine and centrifugal clutch may include, e.g., the torque plate 58 with recesses 68 formed therein for mating and slidable engagement with the clutch mechanism 52 (or any other mechanism, other than the recesses 68, suitable for such mating and slidable engagement with the clutch mechanism 52), the mount plate 70, a battery 74, the housing 72, and/or any other component(s) described herein. Any of the components, and combinations thereof, described herein may be provided as part of a kit for upgrading existing engines and centrifugal clutches to achieve the presently described embodiments. For example, such a kit may include a replacement centrifugal clutch 20 comprising a hub 22 and a hub mating mechanism 24, a replacement drum 26 comprising a rotor 42, for replacing an existing drum of an existing centrifugal clutch, a replacement driven shaft 16 comprising a driven shaft mating mechanism 18, for replacing an existing driven shaft, and/or any other of the components and/or parts thereof described herein, including any connection mechanisms or means for attaching such components to each other, to an existing engine and/or centrifugal clutch, and/or to other components such as a battery 74, battery management system 76, control unit 82, and/or an external load 78, for example, each of which may also comprise components or parts within a kit. As a further example, a kit may comprise a replacement centrifugal clutch 20 comprising a central hub 22 and a drum 26, as described herein, and the hub 22 of the replacement centrifugal clutch 20 may comprise a hub mating mechanism 24, and the drum 26 of the replacement centrifugal clutch 20 may comprise a rotor 42, as also described herein. Such kit may also comprise, e.g., a replacement driven shaft 16 comprising a driven shaft mating mechanism 18, as described herein.

While the foregoing has been described in some detail for purposes of clarity and understanding, it will be appreciated by those skilled in the relevant arts, once they have been made familiar with this disclosure, that various changes in form and detail can be made without departing from the true scope of the appended claims. The present application is therefore not to be limited to the exact components or details of methodology or construction set forth above. Except to the extent necessary or inherent in the processes themselves, no particular order to steps or stages of methods or processes described in this disclosure, including in the figures, is intended or implied, and the order of process or method steps may be varied and/or made sequential or parallel without changing the purpose, effect, or import of the method(s) described.

What is claimed is:

1. A hybrid electric/combustion propulsion and electric generator apparatus for use with an internal combustion engine comprising a driving shaft, a driven shaft, and a centrifugal clutch between the driving shaft and the driven shaft, the centrifugal clutch comprising a central hub, a drum about the hub, and spring-loaded flyweights between the hub and the drum, the driving shaft matingly engaged with the hub such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum, the apparatus comprising:
 a driven shaft mating mechanism, the driven shaft comprising the driven shaft mating mechanism;
 a hub mating mechanism, the central hub comprising the hub mating mechanism;
 an electric machine operable as either an electric motor or an electric generator, the electric machine comprising:
  a rotor;
  a stator; and
  windings on one of the rotor and the stator, the windings comprising an electrically conductive material;
  the rotor comprising the drum such that rotation of the drum similarly rotates the rotor, and rotation of the rotor similarly rotates the drum;
 a single non-friction-based clutch mechanism comprising a first mating mechanism and a second mating mechanism, the clutch mechanism axially slidable and cooperatively engaged with the drum of the centrifugal clutch and the rotor of the electric machine by said first mating mechanism;
 and
 a single operating mode selection mechanism for said axial sliding of the clutch mechanism into one of (i) a start position, (ii) a neutral position, and (iii) a drive position, wherein:
  in the start position, (i) the clutch mechanism is disengaged from the driven shaft, and (ii) the second mating mechanism of the clutch mechanism is matingly engaged with the hub mating mechanism of the hub of the centrifugal clutch and thereby cooperatively engaged with the driving shaft of the internal combustion engine;
  in the neutral position, the clutch mechanism is disengaged from (i) the driven shaft and (ii) the hub of the centrifugal clutch and thereby disengaged from the driving shaft of the internal combustion engine; and
  in the drive position, (i) the clutch mechanism is disengaged from the hub of the centrifugal clutch and thereby disengaged from the driving shaft of the internal combustion engine, and (ii) the second mating mechanism of the clutch mechanism is matingly engaged with the driven shaft mating mechanism and thereby matingly engaged with the driven shaft of the internal combustion engine;
 wherein:
 in the start position, the electric machine is operable as said electric motor to rotate the hub of the centrifugal clutch to thereby rotate the driving shaft to start the engine;
 in the neutral position, driving the driving shaft to rotate the centrifugal clutch to at least the threshold speed causes the rotor to rotate through said frictional engagement between the drum and the flyweights, to thereby operate the electric machine as said generator to produce electricity; and
 in the drive position, either:
  (i) the apparatus is operable in a pure electric drive mode, wherein the electric machine is operable as said electric motor to drive the driven shaft clockwise or counter clockwise to thereby propel a vehicle comprising the apparatus forward or reverse by electric propulsion only; or (ii) driving the driving shaft to rotate the centrifugal clutch to at least the threshold speed causes rotation of (a) the rotor through said frictional engagement between the drum and the flyweights, and (b) the driven shaft through said mating engagement between the second mating mechanism of the clutch mechanism and the driven shaft mating mechanism of the driven shaft, the apparatus operable either (I) in a hybrid propulsion mode during which both the engine and the electric machine operating as said electric motor drive the driven shaft, or (II) in a propulsion/generation mode during which only the engine drives the driven shaft and the electric machine operates as said electric generator to produce said electricity.

2. The apparatus of claim 1, wherein the driving shaft, the hub, the clutch mechanism, and the driven shaft are generally axially aligned.

3. The apparatus of claim 1, wherein the clutch mechanism comprises a dog clutch.

4. The apparatus of claim 1, wherein:

each of the driven shaft mating mechanism, the hub mating mechanism, the first mating mechanism, and the second mating mechanism comprises a plurality of tooth members, the plurality of tooth members of each of the driven shaft mating mechanism and the hub mating mechanism capable of mating engagement with the plurality of tooth members of the second mating mechanism of the clutch mechanism;

the apparatus further comprising a torque plate fixedly attached about a perimeter thereof to an end of the rotor or the drum, the plurality of tooth members of the first mating mechanism of the clutch mechanism slidably received within corresponding recesses formed concentrically about a center of the torque plate and about the clutch mechanism, such that the clutch mechanism is slidable generally through the center of the torque plate.

5. The apparatus of claim 1, wherein selection of the hybrid propulsion mode or the propulsion/generation mode when the clutch mechanism is in the drive position occurs automatically by a control unit connected to the apparatus.

6. The apparatus of claim 5, wherein said selection by the control unit is based on factors comprising charge remaining in a battery connected to the electric machine and/or engine load.

7. The apparatus of claim 1, wherein the electric machine operating as said electric motor is operable to rotate the clutch mechanism via the cooperative connection between the first mating mechanism of the clutch mechanism and the rotor of the electric machine, to thereby facilitate alignment between the second mating mechanism of the clutch mechanism and the hub mating mechanism or the driven shaft mating mechanism to thereby matingly engage the clutch mechanism with the hub or the driven shaft, respectively.

8. The apparatus of claim 1, wherein the apparatus further comprises an air gap between the drum and the rotor.

9. The apparatus of claim 1, further comprising a second air gap between the rotor and the stator.

10. The apparatus of claim 1, wherein the rotor comprises said windings.

11. The apparatus of claim 10, wherein the electric motor comprises an inductance motor.

12. The apparatus of claim 1, wherein the stator comprises said windings.

13. The apparatus of claim 12, wherein the electric motor comprises a brushless direct current (BLDC) motor and the rotor comprises a plurality of evenly spaced permanent magnets.

14. The apparatus of claim 12, wherein the electric motor comprises a switched reluctance motor (SRM) and the rotor comprises a plurality of evenly spaced protrusions, each of said protrusions comprising a ferromagnetic material.

15. The apparatus of claim 1, wherein the rotor and the drum are matingly attached to one another.

16. The apparatus of claim 15, wherein the rotor is attached to the drum via a plurality of rigid fasteners.

17. The apparatus of claim 15, wherein the rotor is attached to the drum via a plurality of flexible fasteners.

18. A kit for upgrading an internal combustion engine comprising a driving shaft, a driven shaft, and a centrifugal clutch between the driving shaft and the driven shaft, to a hybrid electric/combustion propulsion and electric generator apparatus, the centrifugal clutch comprising a central hub, a drum about the hub, and spring-loaded flyweights between the hub and the drum, the driving shaft matingly engaged with the hub such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum, the kit comprising:

a driven shaft mating mechanism matingly attachable to the driven shaft;

a hub mating mechanism matingly attachable to the central hub;

a rotor matingly attachable to the drum of the centrifugal clutch;

a stator attachable to the engine;

windings, comprising an electrically conductive material, on one of the rotor and the stator;

a plurality of magnets evenly spaced about another of the rotor and the stator;

a single non-friction-based clutch mechanism comprising a first mating mechanism and a second mating mechanism, the clutch mechanism for cooperative and axially slidable engagement with the drum of the centrifugal clutch and the rotor by said first mating mechanism; and a single operating mode selection mechanism for said axial sliding of the clutch mechanism into one of (i) a start position, (ii) a neutral position, and (iii) a drive position when the kit is assembled to provide the apparatus such that the driven shaft mating mechanism is matingly attached to the driven shaft, the hub mating mechanism is matingly attached to the central hub, the rotor is matingly attached to the drum, the stator is attached to the engine concentrically about the rotor and the drum, and the single operating mode selection mechanism is cooperatively attached to the clutch mechanism, the rotor, the stator, the windings, and the magnets comprising an electric machine operable as either an electric motor or an electric generator, the electric machine attachable to a power store;

wherein:

in the start position, (i) the clutch mechanism is disengaged from the driven shaft, and (ii) the second mating mechanism of the clutch mechanism is matingly engaged with the hub mating mechanism of the hub of the centrifugal clutch and thereby cooperatively engaged with the driving shaft of the internal combustion engine;

in the neutral position, the clutch mechanism is disengaged from (i) the driven shaft and (ii) the hub of the centrifugal clutch and thereby disengaged from the driving shaft of the internal combustion engine; and in the drive position, (i) the clutch mechanism is disengaged from the hub of the centrifugal clutch and thereby disengaged from the driving shaft of the internal combustion engine, and (ii) the second mating mechanism of the clutch mechanism is matingly engaged with the driven shaft mating mechanism and thereby matingly engaged with the driven shaft of the internal combustion engine;

wherein:

in the start position, the electric machine is operable as said electric motor to rotate the hub of the centrifugal clutch to thereby rotate the driving shaft to start the engine;

in the neutral position, driving the driving shaft to rotate the centrifugal clutch to at least the threshold speed causes the rotor to rotate through said frictional engagement between the drum and the flyweights, to thereby operate the electric machine as said generator to produce electricity; and in the drive position, either:

(i) the apparatus is operable in a pure electric drive mode, wherein the electric machine is operable as said electric motor to drive the driven shaft clockwise or counter clockwise to thereby propel a vehicle comprising the apparatus forward or reverse by electric propulsion only; or (ii) driving the driving shaft to rotate the centrifugal clutch to at least the threshold speed causes rotation of (a) the rotor through said frictional engagement between the drum and the flyweights, and (b) the driven shaft through said mating engagement between the second mating mechanism of the clutch mechanism and the driven shaft mating mechanism of the driven shaft, the apparatus operable either (I) in a hybrid propulsion mode during which both the engine and the electric machine operating as said electric motor drive the driven shaft, or (II) in a propulsion/generation mode during which only the engine drives the driven shaft and the electric machine operates as said electric generator to produce said electricity.

19. A kit for upgrading an internal combustion engine comprising a driving shaft, a driven shaft, and a centrifugal clutch between the driving shaft and the driven shaft, to a hybrid electric/combustion propulsion and electric generator apparatus, the centrifugal clutch comprising a central hub, a drum about the hub, and spring-loaded flyweights between the hub and the drum, the driving shaft matingly engaged with the hub such that rotation of the driving shaft causes rotation of the centrifugal clutch to thereby rotate the spring-loaded flyweights, rotation of the centrifugal clutch at or beyond a threshold speed causing the flyweights to move, under centrifugal force, outward until the flyweights frictionally engage the drum to thereby cause rotation of the drum, the kit comprising:

a driven shaft mating mechanism matingly attachable to the driven shaft;

a hub mating mechanism matingly attachable to the central hub;

a replacement drum comprising a rotor, for replacing the drum;

a stator attachable to the engine;

windings, comprising an electrically conductive material, on one of the rotor and the stator;

a plurality of magnets evenly spaced about another of the rotor and the stator;

a single non-friction-based clutch mechanism comprising a first mating mechanism and a second mating mechanism, the clutch mechanism for cooperative and axially slidable engagement with the replacement drum of the centrifugal clutch and the rotor by said first mating mechanism; and a single operating mode selection mechanism for said axial sliding of the clutch mechanism into one of (i) a start position, (ii) a neutral position, and (iii) a drive position when the kit is assembled to provide the apparatus such that the driven shaft mating mechanism is matingly attached to the driven shaft, the hub mating mechanism is matingly attached to the central hub, the replacement drum is installed in place of the drum, the stator is attached to the engine concentrically about the rotor and the replacement drum, and the single operating mode selection mechanism is cooperatively attached to the clutch mechanism, the rotor, the stator, the windings, and the magnets comprising an electric machine operable as either an electric motor or an electric generator, the electric machine attachable to a power store;

wherein:

in the start position, (i) the clutch mechanism is disengaged from the driven shaft, and (ii) the second mating mechanism of the clutch mechanism is matingly engaged with the hub mating mechanism of the hub of the centrifugal clutch and thereby cooperatively engaged with the driving shaft of the internal combustion engine;

in the neutral position, the clutch mechanism is disengaged from (i) the driven shaft and (ii) the hub of the centrifugal clutch and thereby disengaged from the driving shaft of the internal combustion engine; and in the drive position, (i) the clutch mechanism is disengaged from the hub of the centrifugal clutch and thereby disengaged from the driving shaft of the internal combustion engine, and (ii) the second mating mechanism of the clutch mechanism is matingly engaged with the driven shaft mating mechanism and thereby matingly engaged with the driven shaft of the internal combustion engine;

wherein:

in the start position, the electric machine is operable as said electric motor to rotate the hub of the centrifugal clutch to thereby rotate the driving shaft to start the engine;

in the neutral position, driving the driving shaft to rotate the centrifugal clutch to at least the threshold speed causes the rotor to rotate through said frictional engagement between the replacement drum and the flyweights, to thereby operate the electric machine as said generator to produce electricity; and in the drive position, either:

(i) the apparatus is operable in a pure electric drive mode, wherein the electric machine is operable as said electric motor to drive the driven shaft clockwise or counter clockwise to thereby propel a vehicle comprising the apparatus forward or reverse by electric propulsion only; or (ii) driving the driving shaft to rotate the centrifugal clutch to at least the threshold speed causes rotation of (a) the rotor through said frictional engagement between the replacement drum and the flyweights, and (b) the driven shaft through said mating engagement between the second mating mechanism of the clutch mechanism and the driven shaft mating mechanism of the driven shaft, the apparatus operable either (I) in a hybrid propulsion mode during which both the engine and the electric machine operating as said electric motor drive the driven shaft, or (II) in a propulsion/generation mode during which only the engine drives the driven shaft and the electric machine operates as said electric generator to produce said electricity.

20. The kit of claim 19, wherein the rotor and the replacement drum are matingly attached to one another.

\* \* \* \* \*